(12) United States Patent
Yoo et al.

(10) Patent No.: US 12,465,276 B2
(45) Date of Patent: Nov. 11, 2025

(54) METHOD AND SYSTEM FOR REFLECTANCE IMAGING OF PERIPHERAL NERVES

(71) Applicant: THE HONG KONG POLYTECHNIC UNIVERSITY, Hong Kong (CN)

(72) Inventors: Jung Sun Yoo, Hong Kong (CN); Ngai Nick Alex Wong, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 357 days.

(21) Appl. No.: 18/061,500

(22) Filed: Dec. 5, 2022

(65) Prior Publication Data

US 2023/0181091 A1 Jun. 15, 2023

Related U.S. Application Data

(60) Provisional application No. 63/265,158, filed on Dec. 9, 2021.

(51) Int. Cl.
| | | |
|---|---|---|
| A61B 5/00 | (2006.01) | |
| G01N 21/27 | (2006.01) | |
| G01N 21/64 | (2006.01) | |

(52) U.S. Cl.
CPC .......... *A61B 5/4041* (2013.01); *A61B 5/0082* (2013.01); *G01N 21/27* (2013.01); *G01N 21/6428* (2013.01); *G01N 2021/6439* (2013.01); *G01N 2201/0612* (2013.01); *G01N 2201/062* (2013.01)

(58) Field of Classification Search
CPC ... A61B 5/4041; A61B 5/0082; A61B 5/4893; A61B 5/7267; A61B 5/0075; A61B 5/0033; A61B 5/004; A61B 5/0059; A61B 5/4029; A61B 5/7264; G01N 21/27; G01N 21/6428; G01N 2021/6439; G01N 2201/0612; G01N 2201/062; G06N 3/08; G06T 7/0012; G06T 2207/20081; G06T 2207/20084
See application file for complete search history.

(56) References Cited

U.S. PATENT DOCUMENTS

| | | | |
|---|---|---|---|
| 2015/0094600 A1 | 4/2015 | Grutzendler et al. | |
| 2017/0290515 A1* | 10/2017 | Butte | A61B 5/0071 |
| 2018/0372648 A1* | 12/2018 | Wissmann | G01N 21/88 |
| 2020/0405148 A1* | 12/2020 | Tran | A61B 3/0008 |

(Continued)

FOREIGN PATENT DOCUMENTS

CN 110021014 A 7/2019

OTHER PUBLICATIONS

Huang et al., "Densely Connected Convolutional Networks," in 2017 IEEE Conference on Computer Vision and Pattern Recognition (CVPR), Honolulu, HI, USA, 2017, pp. 2261-2269, doi: 10.1109/CVPR.2017.243.*

(Continued)

*Primary Examiner* — Bo Joseph Peng
(74) *Attorney, Agent, or Firm* — S&F/WEHRW

(57) ABSTRACT

Methods and systems useful for machine learning assisted imaging and detection of peripheral nerves comprising reflectance imaging spectroscopy. The method can be conducted label-free and in real-time.

5 Claims, 29 Drawing Sheets

(56) References Cited

U.S. PATENT DOCUMENTS

2021/0005308 A1* 1/2021 Klaiman .............. G06T 7/0012

OTHER PUBLICATIONS

Jha et al., "DoubleU-Net: A Deep Convolutional Neural Network for Medical Image Segmentation," in 2020 IEEE 33rd International Symposium on Computer-Based Medical Systems (CBMS), Rochester, MN, USA, 2020, pp. 558-564, doi: 10.1109/CBMS49503.2020.00111.*

Office Action of CN 202211581526.4 issued from the China National Intellectual Property Administration (CNIPA) on Jul. 17, 2025.

* cited by examiner a

| DenseNET201 | Ground truth class | | |
|---|---|---|---|
| Predicted class | Nerve | Opening wound | Tendon |
| Nerve | 2690 | 103 | 64 |
| Opening wound | 102 | 1551 | 80 |
| Tendon | 170 | 85 | 894 | b

| DenseNET169 | Ground truth class | | |
|---|---|---|---|
| Predicted class | Nerve | Opening wound | Tendon |
| Nerve | 2724 | 114 | 19 |
| Opening wound | 134 | 1557 | 42 |
| Tendon | 245 | 159 | 745 |

Figure 12 c

| ResNET50V2 | Ground truth class | | |
|---|---|---|---|
| Predicted class | Nerve | Opening wound | Tendon |
| Nerve | 2769 | 78 | 10 |
| Opening wound | 228 | 1428 | 77 |
| Tendon | 285 | 161 | 703 | d

| ResNET101V2 | Ground truth class | | |
|---|---|---|---|
| Predicted class | Nerve | Opening wound | Tendon |
| Nerve | 2391 | 442 | 24 |
| Opening wound | 56 | 1655 | 22 |
| Tendon | 228 | 283 | 638 | e

| MobileNETv2 | Ground truth class | | |
|---|---|---|---|
| Predicted class | Nerve | Opening wound | Tendon |
| Nerve | 2727 | 113 | 17 |
| Opening wound | 189 | 1485 | 59 |
| Tendon | 259 | 147 | 743 |

Figure 12 (continued)

METHOD AND SYSTEM FOR REFLECTANCE IMAGING OF PERIPHERAL NERVES

REFERENCE TO RELATED APPLICATIONS

This application claims priority from U.S. Provisional Patent Application Number 63/265,158, filed on Dec. 9, 2021, which is incorporated herein by reference in its entirety.

TECHNICAL FIELD

The present disclosure relates to imaging nerves using specific wavelength of light with deep learning assistance.

BACKGROUND

Nerve preservation is one of the primary objectives during surgery. Accidental damage of peripheral nerves can lead to a decrease in nerve activity, e.g., reduction of action potential, which might result in significant complications such as chronic pain, sensory loss, or even ability loss including erectile dysfunction, urinary incontinence, and abnormal vocal cord function. Real-time visualization of nerves with high specificity in the operating room is important to guide surgeons to avoid nerve transection. Currently, the most common clinical practice to identify peripheral nerves is electromyography (EMG), which is a localized detection technique for nerves' electrical activity in the region of interest by inserting two electrodes in the nearby muscle with electrical stimulation. Although EMG is a well-established technique for the surgical use owing to its compactness, it has several intrinsic limitations for reliable nerve identification. First, EMG can identify only a limited area of interest, i.e., a few millimeters, because it is not an imaging-based technique. Second, the quality of EMG is highly dependent on the surgeon's operation experience. Signal detection can be affected by operational factors. For example, loose contact of the electrode on the muscle surface can weaken the EMG signal dramatically. This process may provide false negative feedback. Lastly, EMG is basically an invasive method inserting a needle-type electrode into the patient's body, which may cause muscle injury, bleeding, and even damage to peripheral nerves. There is a chance that EMG shows low activity of the target nerve, because it was damaged by surgeon during insertion providing false positive feedback to surgeon during operation.

There have been several developments to detect nerves in clinical settings with conventional radiological imaging modalities, such as magnetic resonance imaging (MRI), positron emission tomography (PET), and ultrasound imaging. However, these techniques are not suitable for intraoperative use due to bulky size and complicated setup (MRI and PET) or poor resolution to discriminate thin and buried nerves and other non-nerve tissues (PET) or lack of appropriate contrast agents (MRI and ultrasound) or exposure to ionizing radiation (PET). On the other hand, optical imaging can provide direct visual guidance to surgeons for nerve identification with high resolution and high sensitivity. Several advanced optical imaging techniques have been applied to visualize nerves in vivo, such as third-harmonic generation microscopy, coherent anti-stokes Raman scattering microscopy, optical coherence tomography, photoacoustic tomography, and confocal laser scanning microscopy. These techniques have focused mainly on visualization of the optic nerves and have very short working distance, which may interfere with surgery. Moreover, such instrumentations are often complicated and expensive and image processing to generate useful images for surgical guidance is time-consuming.

One notable strategy for intraoperative nerve identification is to apply fluorescent dyes having high specificity for targeting nerves. This approach involves the use of fluorescent organic molecules, fluorescent peptides, or fluorescent nanoparticles. Despite high specificity, their clinical application may be limited due to the concern of toxicity for exogenous fluorescent agents. As of 2022, the Food and Drug Administration (FDA) approved only two fluorescent contrast agents, indocyanine green (ICG) and methylene blue (MB) for clinical use, which are not tissue specific. Development of exogenous fluorescent agents for intraoperative imaging has been hindered by strict verification process to get approval for clinical use.

Nerves comprise two main structures: axon core and myelin sheath. The axon is mainly composed of hydrophilic complexes and myelin is composed of 70-85% lipid and 15-30% protein. The reflection mechanism of nerves is based on thin film interference principle causing constructive and destructive interference in the layered structure of material with different refractive indices. Each stacking layer with membrane or cytosol has slightly different reflective index. According to the recent observation of nerve reflectance under specific range of wavelength, increasing the layers of myelin results in higher reflectance light emitted from the nerve. This indicates myelinated nerve reflectance may provide sufficient contrast compared to background tissue, such as muscle and fat.

Although intraoperative imaging using wavelength-dependent reflectance detection may provide sufficient contrast of nerves to assist surgeons, imaging based on tissue reflectance is still not widely accepted for intraoperative imaging due to low specificity.

Deep learning has been well developed and plays an important role for automatic organ and tissue detection. Convolution neural network (CNN), one of the most widely used deep learning algorithms for biomedical image analysis, is able to do real-time object detection with similar specificity and sensitivity comparable to human experts. As the development of CNN is inspired by mimicking the function of visual cortex in the human brain, many medical images analysis use CNN for imaging data processing. Although biomedical imaging classification and segmentation of nerves have been well adopted in various imaging modalities including MRI, ultrasound with CNN, there are no studies using spectral reflectance to detect nerve with CNN.

There is thus a need to improve methods for visualizing and detecting nerves that address at least some of the challenges described above.

SUMMARY

The present disclosure provides an imaging method to effectively visualize and highlight peripheral nerve. Advantageously, the method can provide real-time imaging of the exact location of peripheral nerve without the use of exogenous agents, such as fluorescent dyes or other conventional radiological imaging modalities. The imaging method is based on a specific wavelength of reflected light produced by a light source irradiating a tissue sample comprising or suspected of comprising the peripheral nerve.

According to a first aspect of the disclosure, there is provided an imaging method for selectively imaging a peripheral nerve in a tissue sample comprising the peripheral nerve or suspected of comprising the peripheral nerve, the method comprising: irradiating the tissue sample with a light source thereby producing a reflected light from the tissue sample; and generating one or more nerve image by detecting the reflected light at a wavelength of 410-490 nm.

In certain embodiments, the peripheral nerve is a myelinated nerve. In certain embodiments, the myelinated nerve is a brachial plexus nerve, a common peroneal nerve, a femoral nerve, a lateral femoral cutaneous nerve, a median nerve, a radial nerve, a radial sciatic nerve, a sciatic nerve, a spinal accessory nerve, a tibial nerve, an ulnar nerve, prostatic nerve or cavernous nerve.

In certain embodiments, the light source comprises coherent light, metal-halide lamp, LED light, mercury lamp, superluminescent diodes, or broadband light sources that provide light across a wide range of wavelength.

In certain embodiments, the light source is a laser beam.

In certain embodiments, the laser beam is generated to provide second harmonic generation excitation.

In certain embodiments, the laser is gas lasers, chemical laser, solid-state laser, fiber laser, photonic crystal laser, semiconductor laser, dye laser, or free-electron laser.

In certain embodiments, a band pass filter is disposed to collect the reflected light at a wavelength of 435-485, 430-450, 440-460, 470-485 and/or 475-485 nm.

In certain embodiments, the tissue sample is obtained from a mammal. In certain embodiments, the tissue sample is obtained from a human, a cat, a dog or cattle.

In certain embodiments, the tissue sample is a homogeneous sample or a heterogeneous sample. In certain embodiments, the tissue sample comprises cancer tissue.

In certain embodiments, a photodetector is used to acquire the reflected light.

According to a second aspect of the present disclosure, there is provided a real time imaging method for selectively imaging a peripheral nerve in a tissue sample, the method comprising: irradiating the tissue sample with a light source thereby producing a reflected light from the tissue sample; detecting the reflected light at the wavelength of 410-490 nm from the tissue sample using a photodetector thereby producing one or more images; analyzing the one or more images with a trained convolution neural network (CNN); and displaying one or more nerve images.

In certain embodiments, the peripheral nerve is a myelinated nerve. In certain embodiments, the myelinated nerve is a brachial plexus nerve, a common peroneal nerve, a femoral nerve, a lateral femoral cutaneous nerve, a median nerve, a radial nerve, a radial sciatic nerve, a sciatic nerve, a spinal accessory nerve, a tibial nerve or an ulnar nerve, prostatic nerve or cavernous nerve.

In certain embodiments, the light source comprises coherent light, metal-halide lamp, LED light, mercury lamp, superluminescent diodes, or broadband light sources that provides light across a wide range of wavelength.

In certain embodiments, the light source is a laser beam.

In certain embodiments, the laser beam is generated to provide second harmonic generation excitation wavelength.

In certain embodiments, the method is an intraoperative in vivo method or an in vitro method.

In certain embodiments, the CNN has been trained by algorithms comprising a first neural network and a second neural network, wherein the first neural network is trained to classify images and the second neural network is trained to segment the nerve.

In certain embodiments, the first neural network is DenseNet201.

In certain embodiments, the second neural network is DoubleUNet.

In certain embodiments, the tissue sample is obtained from a mammal. In certain embodiments, the tissue sample is obtained from a human, a cat, a dog or cattle.

In certain embodiments, the tissue sample is a homogeneous or heterogeneous sample. In certain embodiments, the tissue sample comprises cancer tissue.

In certain embodiments, a photodetector is used to acquire the reflected light.

In certain embodiments, the method is conducted continuously and the one or more nerve images are displayed in real time, e.g., as video.

According to a third aspect of the present disclosure, there is provided a system for real time imaging a peripheral nerve in a tissue sample comprising the peripheral nerve or suspected of comprising the peripheral nerve, the system comprising: a light source configured to irradiate the tissue sample; a photodetector configured to detect reflected light at a wavelength of 410-490 nm emitted from the tissue sample; and a computer configured to generate one or more images from the detected reflected light and analyze the one or more images using a trained convolution neural network (CNN).

In certain embodiments, the light source comprises coherent light, metal-halide lamp, LED light, mercury lamp, superluminescent diodes, or broadband light sources that provides light across a wide range of wavelength.

In certain embodiments, the light source is a laser beam.

In certain embodiments, the laser beam is generated by laser to provide second harmonic generation excitation.

In certain embodiments, the system further comprises a band pass filter to remove reflected light outside of 410-490 nm wavelength.

In certain embodiments, the photodetector is a stereomicroscope.

In certain embodiments, the CNN has been trained by algorithms comprising a first neural network and a second neural network, wherein the first neural network is trained to classify images and the second neural network is trained to segment the nerve.

In certain embodiments, the first neural network is DenseNet201.

In certain embodiments, the second neural network is DoubleUNet.

In certain embodiments, the peripheral nerve is a myelinated nerve. In certain embodiments, the myelinated nerve is a brachial plexus nerve, a common peroneal nerve, a femoral nerve, a lateral femoral cutaneous nerve, a median nerve, a radial nerve, a radial sciatic nerve, a sciatic nerve, a spinal accessory nerve, a tibial nerve or an ulnar nerve, prostatic nerve or cavernous nerve.

BRIEF DESCRIPTION OF THE DRAWINGS

FIG. 12. Confusion Matrix of the adopted classification models in independent video test cohort. (a) DenseNET201 (b)DenseNET169 (c) ResNET50V2 (d) ResNET101V2 (e) MobileNETv2.

DETAILED DESCRIPTION

Figure 1:
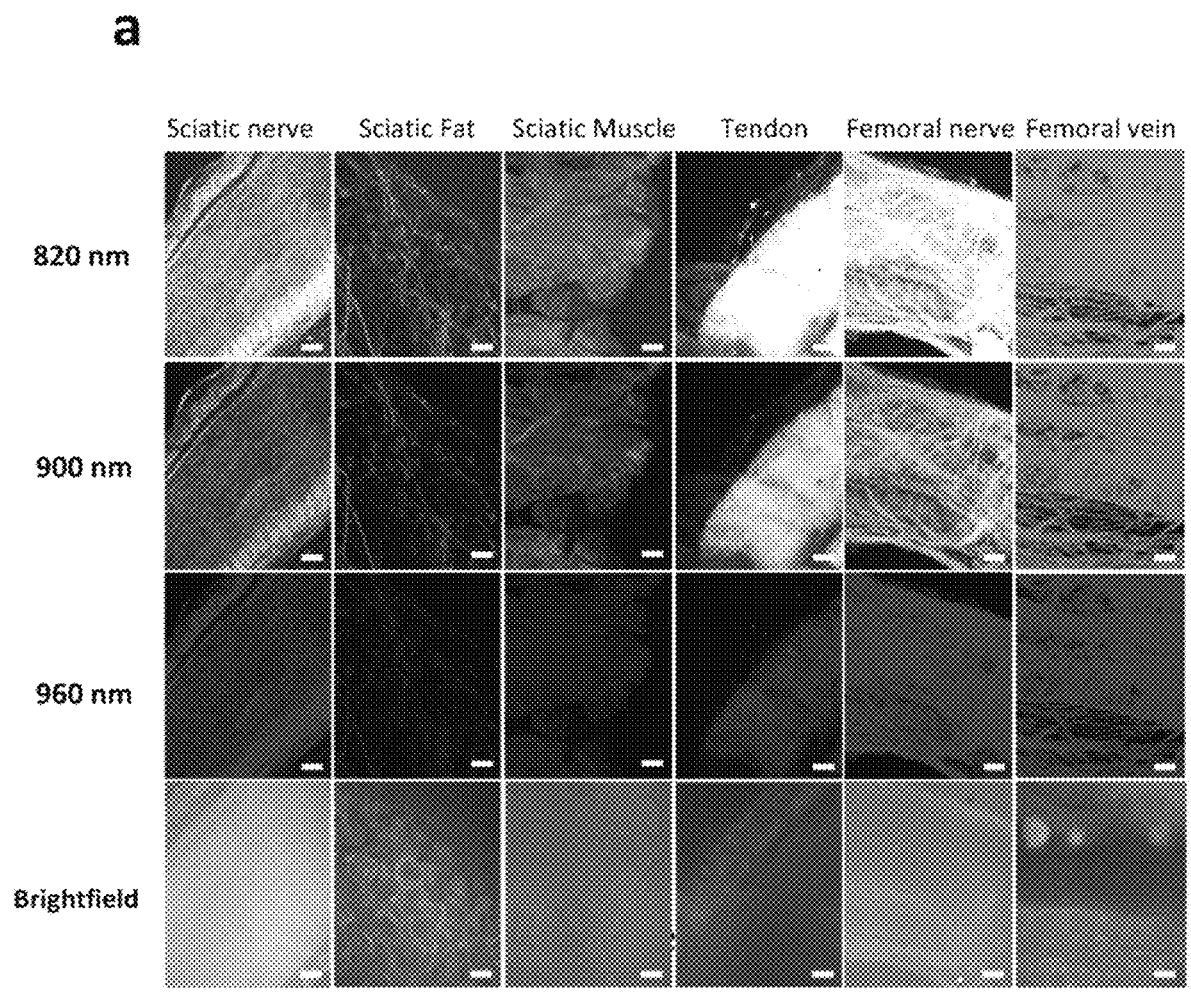
FIG. 1. Ex vivo second harmonic generation (SHG) spectral reflectance wavelength profile of myelinated nerve and its adjacent tissue. All quantified data are presented as the mean±SEM. (a) All images are representative of data collected for n=5 nerve and its adjacent tissue. Scale bar:200 µm. (b) Normalized Intensity of the nerve and its adjacent tissue. (c) Sciatic nerve's signal to the background tissue ratio(SBR), it is observed at 900 nm have a strong nerve to muscle SBR than other wavelength. (d) Femoral nerve' signal to the background tissue ratio (SBR), it is observed in the region of 880-900 nm have a strong nerve to muscle and nerve to fat SBR than other wavelengths. Scale Bar:100 μm.
Figure 1:
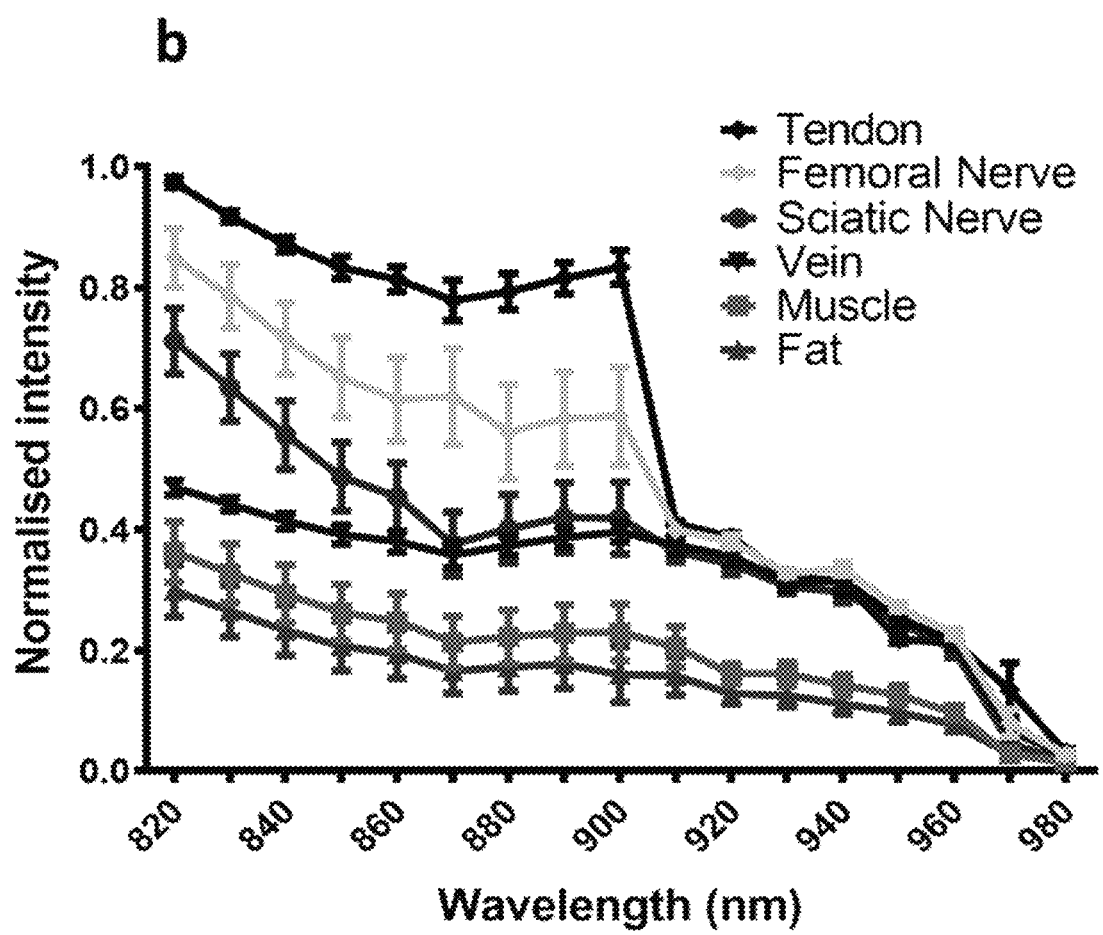
Figure 1:
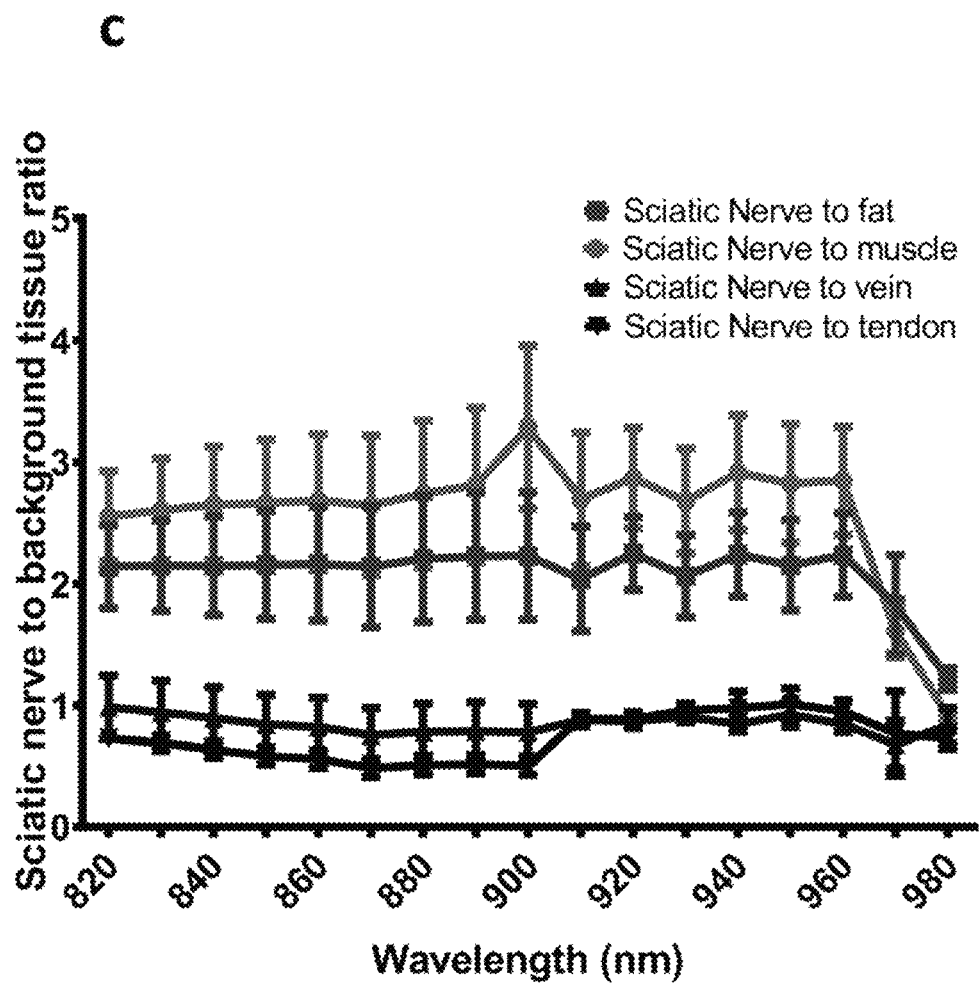
Figure 1:
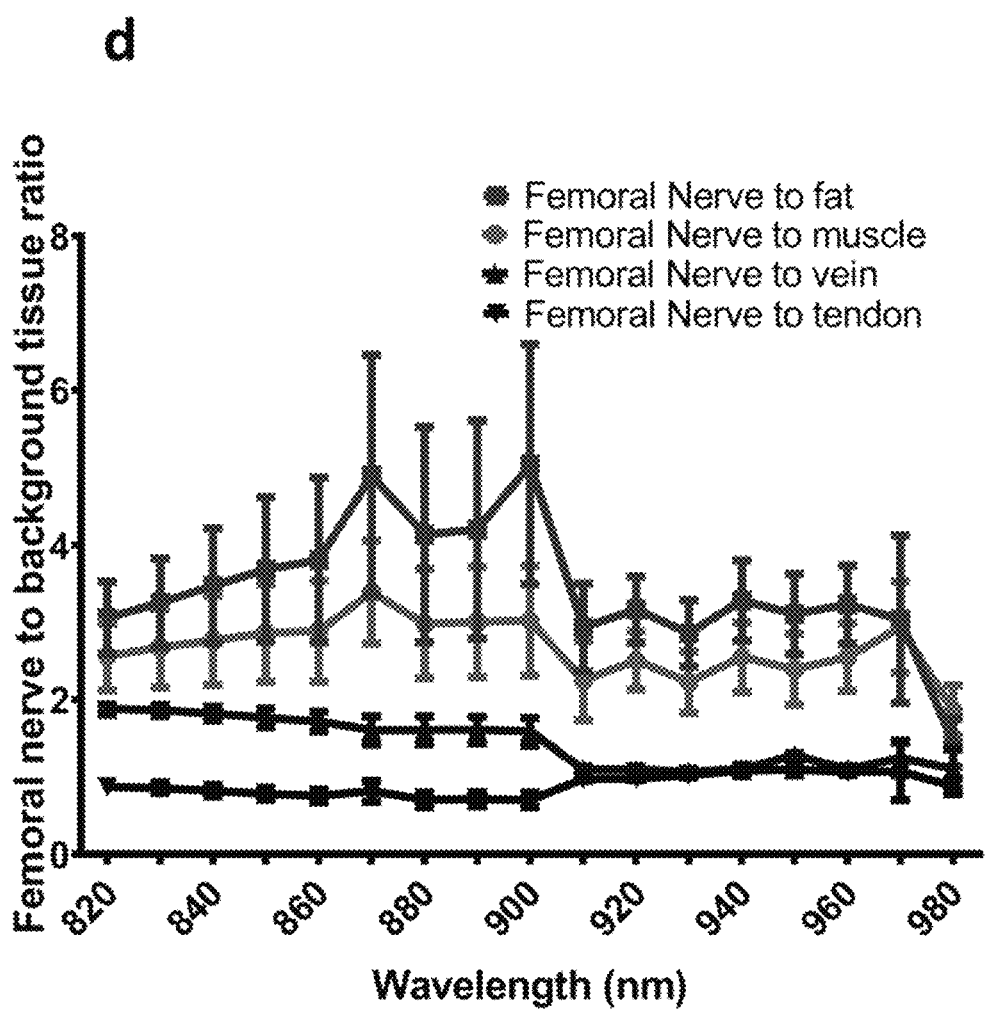
Figure 2:
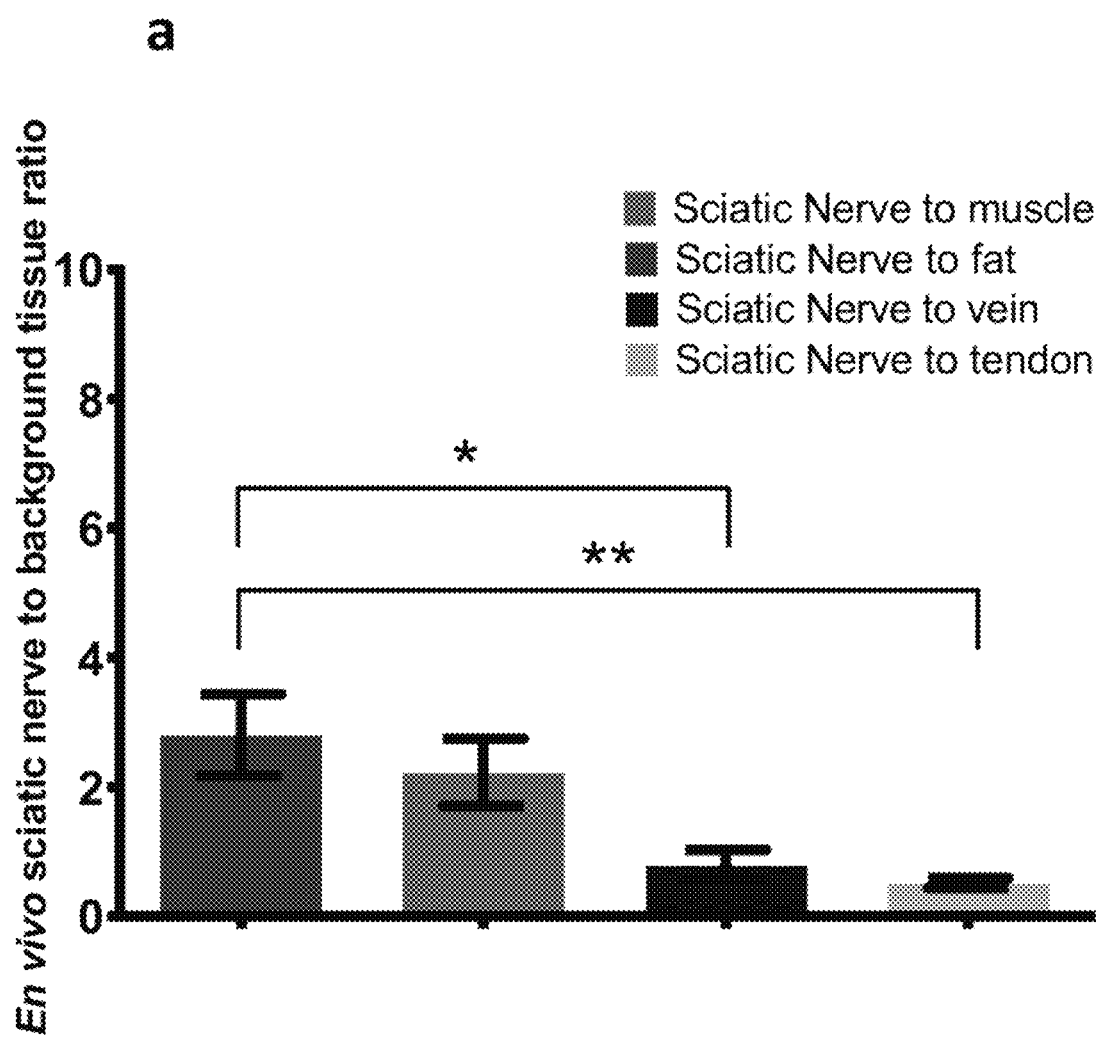
FIG. 2. Ex vivo nerve to background tissue reflectance at 900 nm. Sciatic nerve (a) and Femoral nerve (b) n/b ratio in the region of 900 nm. In (a), the columns from left to right represent sciatic nerve to muscle, sciatic nerve to fat, sciatic nerve to vein and sciatic nerve to tendon respectively. In (b), the columns from left to right represent femoral nerve to muscle, femoral nerve to fat, femoral nerve to vein and femoral nerve to tendon respectively. All quantified data (n=5) are presented as the mean±SEM. Different n/b tissue at 900 nm was compared using a one-way ANOVA followed by a Fisher's LSD multiple comparison test with no assumption of sphericity using the Geisser-Greenhouse correction, where $*P<0.05$, $**P<0.01$.
Figure 2:
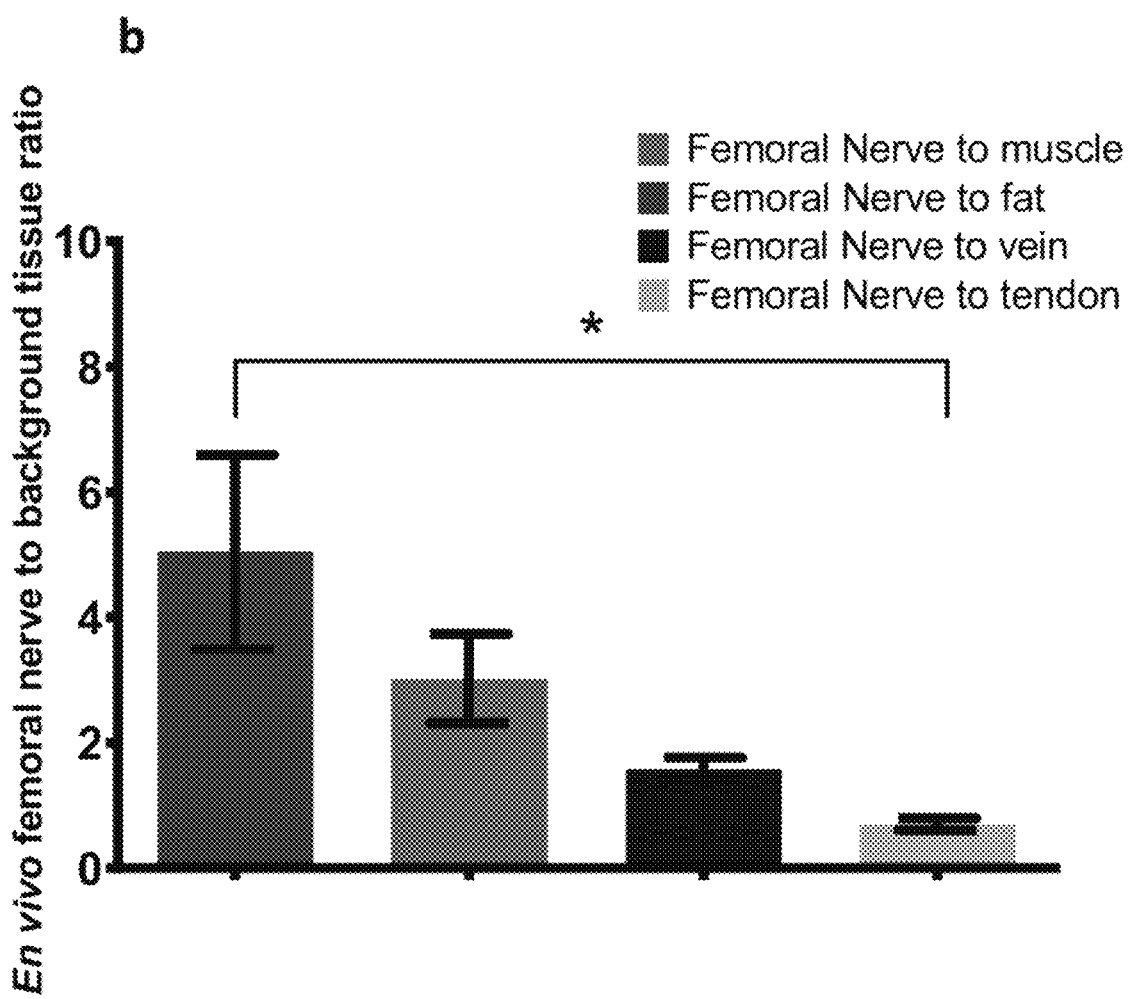

In general, axons of peripheral nervous system neurons are surrounded by Schwann cells, and neurons of the central nervous system may be surrounded by oligodendrocytes. The cell membranes of Schwann cells and oligodendrocytes are specially differentiated and are fused with each other by surrounding axons in several layers. The membrane structure of the fused Schwann cells of several layers surrounding the axon is called the myelin sheath. The axons of most peripheral neurons, including motor and perceptual nerves, are surrounded by myelin sheaths.

Axons enclosed by myelin are termed lacrimal axons or myelinated axons or myelinated nerve fibers, while axons not enclosed by myelin are referred to as unmyelinated axons or anhydrous fibers. The myelin sheath is a complex cellular structure that plays an important role in propagation, axonal insulation and trophic support. While axons are primarily water, myelin is composed of 80% lipids and 20% protein.

"Peripheral nerve" means a passage organ that transmits the senses collected from the surface of the human body, skeletal muscle, and various internal organs to the central nerve, and transmits the motor stimulation of the central nerve to them again. In the peripheral nerves, there are nerves that carry sense and nerves that carry motor signals. Examples of such peripheral nerves include the brachial plexus nerve, the common peroneal nerve, the femoral nerve, the lateral femoral cutaneous nerve, and the median nerve. Radial nerves, sciatic nerves, spinal accessory nerves, tibial nerves, ulnar nerves, and the like.

"Second-harmonic generation" (SHG, also called frequency doubling) is a nonlinear optical process in which two photons with the same frequency interact with a nonlinear material, are "combined", and generate a new photon with twice the energy of the initial photons (equivalently, twice the frequency and half the wavelength), that conserves the coherence of the excitation. It is a special case of sum-frequency generation (2 photons), and more generally of harmonic generation.

"Two-photon fluorescence (2PEF)" involves excitation of electrons to higher energy levels, and subsequent de-excitation by photon emission. Thus, 2PEF is a non-coherent process, spatially (emitted isotropically) and temporally (broad, sample-dependent spectrum). It is also not specific to certain structure, unlike SHG. It can therefore be coupled to SHG in multiphoton imaging to reveal some molecules that do produce autofluorescence, like elastin in tissues (while SHG reveals collagen or myosin for instance).

"Convolutional neural networks" are a specialized type of artificial neural networks that use a mathematical operation called convolution in place of general matrix multiplication in at least one of their layers. They are specifically designed to process pixel data and are used in image recognition and processing. Convolutional neural networks are distinguished from other neural networks by their superior performance with image, speech, or audio signal inputs.

A "photodetector" used herein can refer to any scientific camera or components particularly used or adopted in operating room, which includes Electron Multiplying Charge-Coupled Device (EMCCD) camera, EMCCD image detector, charge-coupled device (CCD) camera, CCD image detector, Scientific CMOS (sCMOS) camera, sCMOS image detector, CMOS cameras or CMOS image detector. In certain embodiments, the photodetector further comprises an optical microscope which includes brightfield microscope, stereomicroscope, darkfield microscope, phase contrast microscope, differential interference contrast microscope, interference reflection microscope, fluorescence microscopy, confocal microscope, two-photon microscope, multiphoton microscope, light sheet fluorescence microscope, and wide-field multiphoton microscope.

According to a first aspect of the disclosure, there is provided an imaging method for selectively imaging a peripheral nerve in a tissue sample comprising the peripheral nerve or suspected of comprising the peripheral nerve, the method comprising: irradiating the tissue sample with a light source thereby producing a reflected light from the tissue sample; and generating one or more nerve images by detecting the reflected light at a wavelength of 410-490 nm.

By way of example, the imaging method can be carried out as follows:

First, providing a photodetector, such as a confocal microscope, e.g., Nikon A1R MP+ multiphoton confocal microscope with a water immersion objective (e.g., Nikon CFI75 Apochromat 25×, 1.1 NA) or a water immersion objective (e.g., Nikon CFI75 Apochromat 16×, 0.8 NA). In certain embodiments, a two-photon confocal microscope is used to acquire the reflected light.

Second, irradiating the tissue sample with a light source that can provide a wide range of wavelength, as long as reflected light at wavelength of 410-490 nm can be obtained. In certain embodiments, the light source can comprise coherent light, metal-halide lamp, LED light, mercury lamp, superluminescent diodes, or broadband light sources that provide light across a wide range of wavelength. In certain embodiments, the light source can be a SHG excitation wavelength at 820-980 nm, such as a laser sold by Coherent® under the tradename Chameleon Vision II™. In certain embodiments, the wavelength is generated by a second harmonic generator.

Third, detecting the reflected light using the photodetector. A band pass filter can be used to exclude certain wavelengths of reflected light. In certain embodiments, a 492 Shortpass(492/SP) filter, a 525/50 filter, a 575/25 filter or a 629/53 filter can be used. The 492/SP filter can be used for detecting tissue reflectance, and other channels can be used for detecting fluorescence signal from tissue, which 525/50 as green, 575/25 as yellow, 629/53 as red.

In certain embodiments, the method is conducted continuously and the one or more nerve images are generated and viewed in real time, e.g., as video.

The tissue sample can be prepared and imaged as follows:

For in vitro imaging of the tissue sample comprising nerves, animals can be fully anesthetized and hair removed. Cut the skin of the animal and remove connective tissue and isolate the target tissue comprising the nerve or suspected of comprising the nerve using scissors and forceps. Transfer the tissue sample onto a glass slide and mount it. The tissue sample can then be irradiated with a light source. Reflectance images of the tissue sample can be acquired with a photodetector. In certain embodiments, a photodetector is sold by Nikon® under the tradename CFI75 Apochromat 25XC W NA 1.1.

For in vivo imaging of the tissue sample comprising nerves, the tissue can be washed with PBS, and a glass coverslip is placed with sufficient amount of phosphate-buffered saline for imaging. Reflectance images of the tissue sample can be acquired with a photodetector. For example, the photodetector is sold by Nikon® under the tradename CFI75 Apochromat 25XC W NA 1.1.

The imaging method is particularly useful for visualizing myelinated nerves. The strong wavelength-specific reflectance from myelin structure surrounding nerve fiber enables selective visualization of the myelinated nerves. In certain embodiments, the myelinated nerve is a brachial plexus nerve, a common peroneal nerve, a femoral nerve, a lateral femoral cutaneous nerve, a median nerve, a radial nerve, a radial sciatic nerve, a sciatic nerve, a spinal accessory nerve, a tibial nerve or an ulnar nerve, prostatic nerve or cavernous nerve. In certain embodiments, the tissue sample is a homogeneous sample or a heterogeneous sample. In certain embodiments, the tissue sample comprises cancer tissue.

It is demonstrated by the inventors that there is a difference in reflectance between nerve and non-nerve tissues with different wavelength regions. In particular, the myelin of the nerves shows strong reflectance at 410-490 nm, 420-480 nm, 430-470 nm, 430-450 nm, 435-485 nm, 440-460 nm, 450 nm, 460-490 nm, 450-460 nm, 455 nm, 475 nm, 480 nm, or 470-485 nm.

In certain embodiment, the reflectance images are acquired from a tissue sample irradiated by a SHG light at 820-980 nm or at 890-900 & 960 nm. In certain embodiments, the SHG excitation wavelength is at 880-920 nm, 890 nm, 900 nm, 910 nm, 950 nm, 960 nm, 970 nm, or 980 nm. In certain embodiments, the SHG excitation wavelength is 870-900 nm, 880-910 nm, 880-970 nm, 890-920 nm, 895-910 nm, 920-970 nm, 940-970 nm, 950-970 nm or 890-910 nm, or 960 nm. In certain embodiment, the wavelength of the irradiating light is at 400-500 nm, 410-490 nm, 420-480 nm, 430-470 nm, 430-450 nm, 435-485 nm, 440-460 nm, 450 nm, 460-490 nm, 450-460 nm, 455 nm, 475 nm, 480 nm, or 470-485 nm. Surprisingly, it was found that myelinated nerves exhibit stronger reflectance when present in heterogeneous cancer environment than non-cancerous environment.

The nerve reflectance at 440-460 nm is not able to highlight nerve in the presence of tissues like tendon. The problem has been solved by a novel imaging method with the combination of nerve-specific spectral imaging and the assistance of deep learning. It is shown the sensitivity for nerve detection and segmentation has been significantly improved by this method. See, e.g., FIG. 7 and Table 5 of the present disclosures. The reflectance imaging integrated with deep learning displays its superior capability to visualize peripheral nerves specifically in label-free manner. The method and system disclosed herein can be for nerve identification in an in vitro operation or during a surgery. In certain embodiments, surgery includes cancer surgery, plastic surgery, face reconstruction surgery, endoscopic surgery, minimally invasive surgery, robotic surgery, or surgery involved or integrated with augmented reality or virtual reality. In certain embodiments, the method of system disclosed herein can be for neuroscience or neurological experiment and research involving nerve psychology, nerve regeneration and therapy.

Therefore, according to a second aspect of the present disclosure, there is provided an imaging method for selectively imaging a peripheral nerve in a tissue sample, the method comprising: irradiating the tissue sample with a light source thereby producing a reflected light from the tissue sample; detecting the reflected light at wavelength of 410-490 nm from the tissue sample using a photodetector thereby producing one or more images; analyzing the one or more images with a trained convolution neural network (CNN); and displaying one or more nerve images.

The imaging method can be carried out as follows:
First, irradiating the tissue sample with a light source that can provide a wide range of wavelength, as long as reflected light at wavelength of 410-490 nm can be acquired. In certain embodiments, the light source can include coherent light, metal-halide lamp, LED light, mercury lamp, superluminescent diodes, or broadband light sources that provide light across a wide range of wavelength. In certain embodiments, the light source is a laser beam provides second harmonic generation excitation at 820-980 nm. The laser beam can be a tunable laser, such as a laser sold by Coherent® under the tradename Chameleon Vision™ II. In certain embodiment, the laser is to provide second harmonic generation excitation. In certain embodiments, the wavelength is generated by a second harmonic generator.

Second, detecting the reflected light from the tissue sample by a photodetector (e.g., Nikon SMZ18 stereomicroscope). Reflectance filter can be used to remove undesirable wavelength. The acquired reflectance can be saved in an audio-video interlaced (AVI) format at maximum frame rate of 17.39-18.39 fps.

In certain embodiments, the method is conducted continuously and the one or more nerve images are displayed in real time, e.g., as video.

The frame rate of the video can be reduced to 600 ms per frame(~1.67 fps). The reduced frame rate video images (RFRVI) can then be extracted and labelled the remaining frame to the corresponding category e.g. "opening wound", "tendon", "nerve" by their related surgical action.

The extracted image can be normalized by input laser intensity and PMT sensitivity. Using normalized images, nerves and adjacent non-nerve tissue are hand selected using an image tool such as the polygon shape tool in ImageJ to select and demarcate regions of interest for nerve and its adjacent non-nerve tissue. The mean pixel intensities within the selected areas are compared for nerve against adjacent tissues to calculate the signal of nerve to non-nerve contrast.

Third, labelling image class and annotating the nerve segmentations.

For annotation of the nerve segment, each frame from nerve can be manually labelled masks using available online annotation services.

A deep learning model is used for nerve image classification and segmentation. In the present disclosure, CNN is chosen for image process and analysis.

Figure 11:
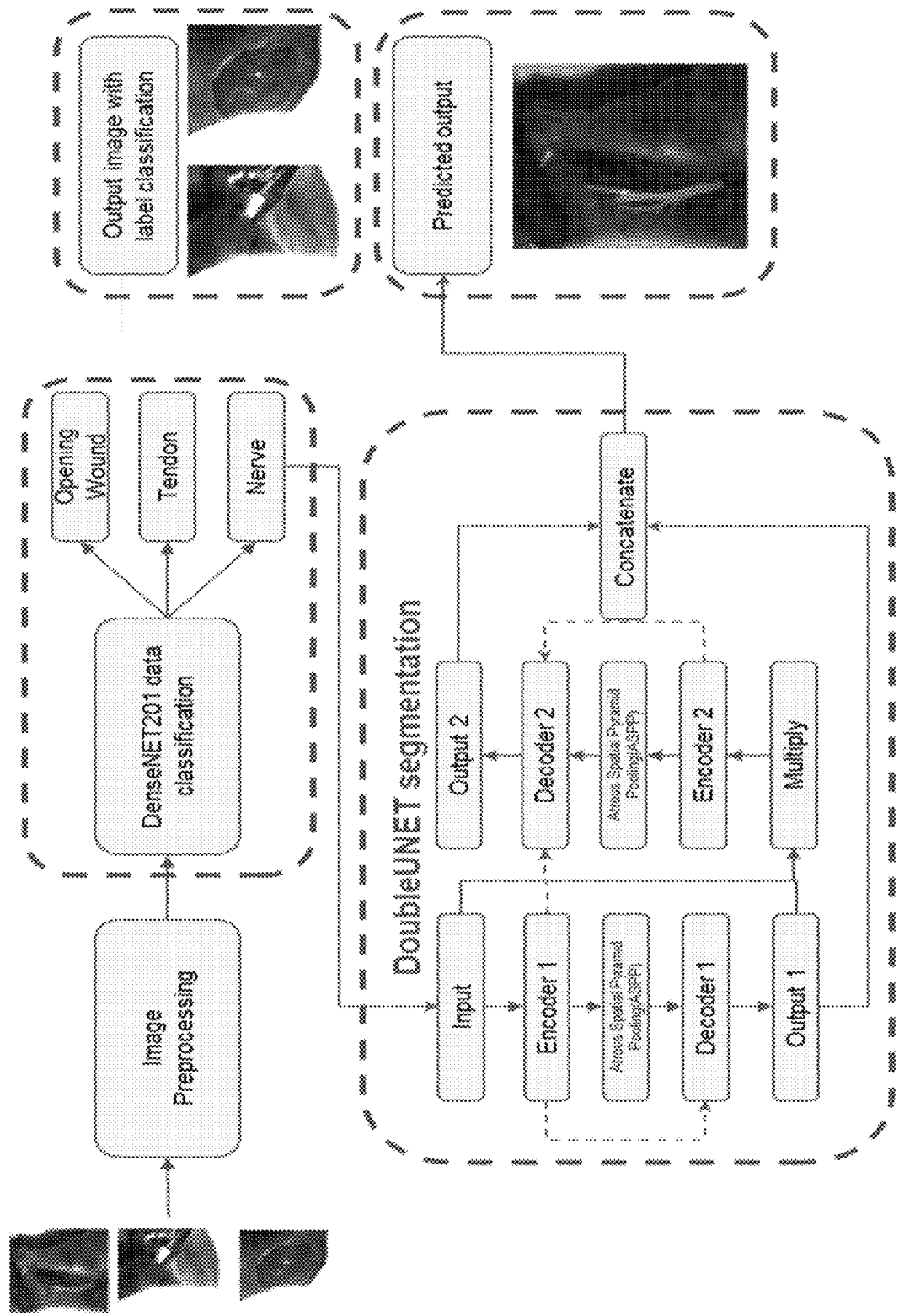
Figure 14:
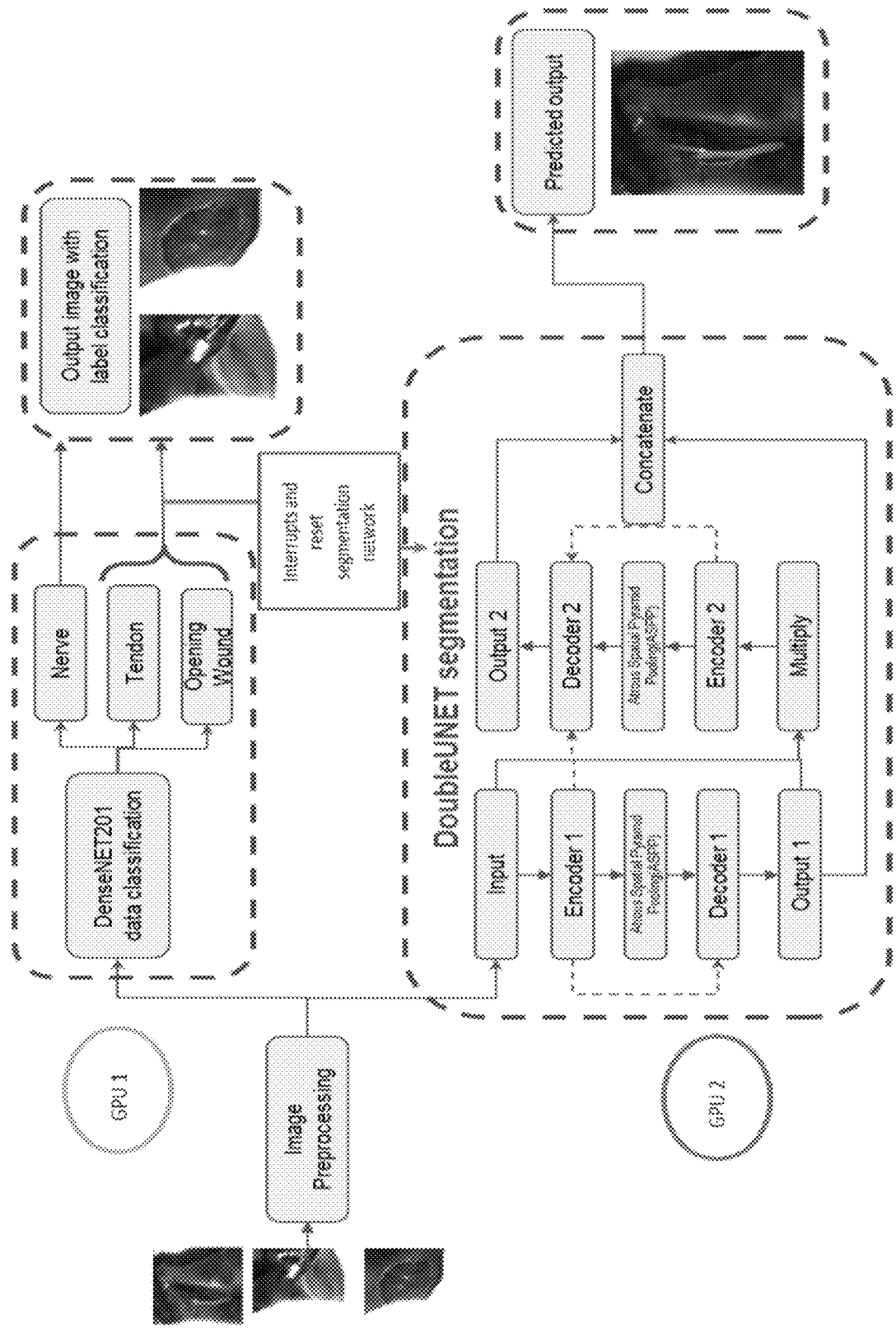
FIG. 14. Schematic diagram of the proposed MTDLS for processing the nerve-specific reflectance video recording with parallel processing. GPU represents graphics processing unit.

Two different deep learning models have been demonstrated to be useful for selectively visualizing peripheral nerves. The first neural network model has been trained to classify images based on the surgical action or presence of tissue of interest. After comparing the performance of the adopted neural networks for classification, it was found DenseNet201 provided the best discriminative ability of nerve images. The second neural network model has been trained to segment nerve. After comparing the performance of the adopted neural networks for segmentation, it was found DoubleUNet provides the best ability in segmenting nerve. FIGS. 11 and 15 show the details of the modalities of the deep learning system. Briefly, FIG. 11 shows in the first stage, video is pre-processed and video frames are extracted. Image features from each video frame are extracted through the convolutional network DenseNET201 to recognize video frames containing nerves. Only video frames containing nerves will be selected for further processing. In the second stage, the DoubleUNet will place a binary mask to delineate accurate nerve segments with pseudo-color. FIG. 14 disclose a novel MTDLS which sends input images to 2 different processors and perform classification and segmentation task simultaneously. In particular, when the classification task processor finds nerves are present in the input image, it allows the segmentation task processor to continue performing nerve delineation, or else the nerve image delineation process is interrupted, and the segmentation network is reset. The MTDLS described herein can perform nerve detection and nerve delineation efficiently.

The above methods can be used in real-time (e.g., by generating a plurality of nerve images and displaying them as they are generated) or non-real-time (e.g., displaying a single nerve image). Real-time image display can be useful for both in vitro operation and intraoperative surgical procedures. Also, the above methods can be for therapeutic, non-therapeutic, and/or diagnostic purposes.

In certain embodiments, the methods are used for imaging myelinated nerves under heterogenous environment, such as in a cancerous environment. Cancers include but not limited to cancer in anus, bile duct, bladder, bone, bone marrow, bowel (including colon and rectum), breast, eye, gall bladder, kidney, mouth, larynx, esophagus, stomach, testis, cervix, neck, ovary, lung, mesothelioma, neuroendocrine, penis, skin, spinal cord, thyroid, vagina, vulva, uterus, liver, muscle, pancreas, and prostate. Exemplary cancers include, but are not limited to, carcinomas, melanoma, mesothelioma, soft tissue sarcoma, pancreatic cancer, lung cancer, and lymphoma (Hodgkin's and non-Hodgkin's), and multiple myeloma. In certain embodiments, the cancer is breast cancer or leukemia.

In certain embodiments, the method can be used to visualize peripheral nerves obtained from mammals, such as a human, a cat, a dog, or cattle.

According to a third aspect of the present disclosure, there is provided a system for real time imaging a peripheral nerve in a tissue sample comprising the peripheral nerve or suspected of comprising the peripheral nerve, the system comprising: a light source configured to irradiate the tissue sample; a photodetector configured to detect reflected light at a wavelength of 410-490 nm emitted from the tissue sample; and a computer configured to generate one or more images from the detected reflected light and analyze the one or more images using a trained convolution neural network (CNN).

The system can further comprise a filter to remove irradiating light that cannot produce reflected light at 410-490 nm from the tissue sample. In certain embodiments, the system can further comprise a filter to remove reflected light outside of 410-490 nm.

In certain embodiment, the light source comprises coherent light, metal-halide lamp, LED light, mercury lamp, superluminescent diodes, or broadband light sources that provides light across a wide range of wavelength.

In certain embodiment, the light source is a laser beam.

In certain embodiment, the laser beam is a laser to provide second harmonic generation excitation. The system trains machine learning models or deep learning models to identify specific anatomical structure of peripheral nerve within surgical videos recorded under nerve-specific reflectance wavelength and provide real-time highlighting of those nerve structure using video media (digital screen, smartglasses, etc). For instance, the system disclosed herein trains the model on the one or more extracted images from the imaging system that mentioned in the present disclosure in which one or more extracted images are labelled according to the tissue(s) of interest present one or more extracted images. (e.g. opening wound, presence with tendon, presence with nerve, etc.). Once the image classification has learned algorithmically (convolutional neural networks, long-short term memory, dynamic time warping, etc.), the device can filter and find all possible extracted images with the presence of nerve in the extracted image and highlight them. More generally, the surgeon or qualified medical experts can outline nerve segments from pre-classified nerve extracted image(s) by the image classification algorithm, the deep learning model for nerve segmentation will train and learn nerve segmentation annotation from the one or more extracted images that classify with the presence of nerve. Nerve segment can be identified from the nerve-related extracted images that was previously learned by machine learning algorithms or other deep learning algorithms approach. For system quality control for the image classification algorithm, this can be assessed by predictive matrix (e.g. sensitivity, specificity, positive predictive value, negative predictive value, accuracy, F1 score, Matthew correlation coefficient, and area under the receiver operating characteristic curve, etc) for classifying the one or more extracted images with or without presence of nerve. For system quality control for the nerve segmentation algorithm, this can be assessed by computing a similarity metric (e.g. Dice coefficient, and IoU, etc).

In certain embodiments, a stereomicroscope is used to detect reflected light of the tissue sample.

In certain embodiments, the CNN has been trained by algorithms comprising a first neural network and a second neural network, wherein the first neural network is trained to classify images based on the surgical action or presence of the tissue of interest and the second neural network is trained to segment the nerve.

In certain embodiments, the first neural network is DenseNet201.

In certain embodiments, the second neural network is DoubleUNet.

In certain embodiments, the system is used for imaging myelinated nerves under heterogenous environment, such as in a cancerous environment.

As more surgical video is gathered, the system disclosed herein may self-update: The system may also generate the labelling of nerve-related segment extracted images and nerve segment from the nerve related extracted images. While annotation of the surgical video comprising extracted images requires a significant amount of man-power, once the system generates the labels from the new surgical extracted images, those labels may be provided to the surgeons or the qualified medical experts to access the quality of system generated labels. Once image label related to nerve and its segments has been assessed, the model can be re-trained and improve the detection of nerve based on original and additional surgical video with nerve related label. After training, the model can be run locally in real time on any conventional computer or mobile device.

Another aspect of the present disclosure comprises a reverse system, which instead of highlighting the anatomical structure of nerve to surgeon using deep learning model for nerve segmentation, the image classification can alert the surgeon when deep learning model for nerve segmentation provide a confusing nerve segment. For instance, the image classification model may alert the surgeon there is the presence of nerve on unfocused images, or even nerve condition is too small, too diseased, or too damaged for the deep learning model for nerve segmentation to highlight its precise location. Once the image classification model detects presence of nerve from the video frame, the system may provide a notification to the surgeon to conduct the surgical procedure with extra cautious to prevent damage to nerve during surgery. In certain embodiments, the tissue sample is a homogeneous or heterogeneous sample. In certain embodiments, the tissue sample is a cancerous sample. In certain embodiments, the intraoperative real time imaging method and deep learning are capable of distinguishing nerve from tendon.

EXAMPLES

Materials and Methods

Animals. All animal procedures were approved by and carried out in accordance with the Hong Kong Polytechnic University ASESC guidelines and all animals were purchased from the centralized animal facility. Animals used included BALB/c mice (8-10 weeks old, 20-25 g) and BALB/c nude mice (4-6 weeks old, 18-20 g). No statistical methods were used to predetermine sample size. Randomization and a power analysis were not necessary for this study.

Optical Setup of Two-photon Confocal Microscopy

A Nikon A1R MP+ multiphoton confocal microscope with a water immersion objective (Nikon CFI75 Apochromat 25×, 1.1 NA) or a water immersion objective (Nikon CFI75 Apochromat 16×, 0.8 NA), and SHG excitation wavelength from 820-980 nm as wavelength output from a tunable laser (Coherent Chameleon Vision II) were adopted. The reflectance light was collected in the form of SHG using four photodetectors through the 492 Shortpass(492/SP) filter, 525/50 filter, 575/25 filter and 629/53 filter, respectively. The 492/SP filter was considered as the channel representing as tissue reflectance, and other channels were considered as showing as detecting fluorescence signal from tissue, which 525/50 as green, 575/25 as yellow, 629/53 as red.

Preparation of Tissues Isolation and Ex Vivo Tissue Imaging Using Two-Photon Confocal Microscopy Balb/c mice (male, n=5, 8-10 weeks) were fully anesthetized using intraperitoneal injection of a mixture of Xylazine (Rompun, 0.4 mL/kg) and Tiletamine hydrochloride (Zoletil, 0.6 mL/kg). Hair from lower abdominal quadrant and the legs were removed entirely by electric razor and waxing cream. The surgical area was wiped with 70% ethanol. Cut the skin at the outside of the thigh, and the muscles, sciatic nerve, and sciatic tendon were separated carefully using scissors and forceps carefully. The isolated tissues were collected with approximately 1 cm length and collected in eppendorf tube with phosphate-buffered saline. Cut the skin at the inside of the thigh and remove connective and isolate the femoral nerve using scissors and forceps carefully. Dissect femoral nerve with 1 cm length and collect it inside an eppendorf tube with phosphate-buffered saline. Separate femoral vein by slightly stretching and carefully dissecting through the connective tissue sheet. Open the abdomen, isolate mesenteric fat tissue and mesenteric vein with 1 cm length. Collect it into an eppendorf tube with phosphate-buffered saline. Transfer each tissue sample onto slide glass and mount them with antifade mounting (P36930 Invitrogen™, thermofisher). Each tissue sample was scanned by the SHG excitation wavelength from 820-980 nm at 10 nm interval. Reflectance images of each tissue sample were acquired with a water immersion objective lens (CFI75 Apochromat 25XC W NA 1.1).

In Vivo Imaging of the Murine Sciatic Nerve Using Two-Photon Confocal Microscopy Mice (8-10-week-old balb/c male, n=3) were fully anesthetized using Xylazine/Tiletamine hydrochloride mentioned above. After full anesthesia, the femur skin and muscle were gently dissected till exposing sciatic nerve. The glass coverslip was placed on the top of sciatic nerve with sufficient amount of phosphate-buffered saline, and adjust the position of the leg of the mice to ensure the glass coverslip is parallel to horizontal plane. The sciatic nerve was scanned from SHG excitation wavelength at 820-980 nm at 10 nm interval. Images of sciatic nerve were acquired with a water immersion objective lens (Nikon CFI75 Apochromat 16×, 0.8 NA).

For in vivo imaging of the murine sciatic nerve with fluoromyelin (F34651 Invitrogen™, thermofisher), 1× fluoromyelin green(~479/598 nm) solution and stain the sciatic nerve for 25 min. The sciatic nerve was washed with PBS 2 times, and the glass coverslip was placed with sufficient amount of phosphate-buffered saline for imaging. The stained sciatic nerve was scanned from 820-980 nm at 10 nm interval. Images of fluoromyelin stained sciatic nerve were acquired with a water immersion objective lens (Nikon CFI75 Apochromat 16×, 0.8 NA).

Cell Culture

4T1-luc-RFP Cell Line

4T1-PB3R is a murine breast cell-line, adherent cell, that stably transfected with a reporter gene system, PB3R construct, which is containing monomeric red fluorescent protein (mRFP) and a firefly luciferase (luc2) gene, and it is provided by Dr. Liang-ting LIN at The Hong Kong Polytechnic University. The 4T1-PB3R cell-line was cultured in RPMI-1640 (HyClone™, GE Healthcare Life Sciences, USA) contained 10% FBS (Fetal bovine serum; Gibco, Brazil) and 1% p/s (penicillin streptomycine; Gibco, USA). 90% confluency of 4T1-PB3R were trypsinized and detached with TE (0.05% Trypsin-EDTA, Gipco, USA) and washed with serum-free RPMI. The collected cells were counted with trypan-blue (Gipco, USA) and automated cell counter (Countess™, Thermo Fisher Scientific, USA). 1 million cells (per mouse) were resuspended in 100 µl of serum-free RPMI for injection.

K562-GFP Cell-Line

K562-GFP is a human leukemia cell-line, suspension cell, that expresses Green Fluorescence (GFP) stably which was transfected with PGK-GFP (phosphoglycerate kinase-Green Fluorescence) plasmid which also has a puromycin resistance gene, and it is obtained from Dr HUANG, Chien-ling at The Hong Kong Polytechnic University. The K562-GFP cells were cultured in RPMI-1640 contained 10% RPMI and 1% p/s. Over than 90% confluency of K562-GFP cells were collected by centrifugation and counted with trypan-blue and automated cell counter. 1 million of cells (per mouse) were resuspended in 100 µl of serum-free RPMI for injection with or without Matrigel (Matrigel H C, BD bioscience, USA). To inject with Matrigel, all the materials are needed to pre-chilled at 4° C., and 100 µl of resuspended cells were mixed with 100 µl of cold Matrigel (1:1).

Establishment of Xenografted Cancer Murine Model.

4T1 xenografted cancer murine model(4T1 XCMM). 4T1-Luc2-RFP cells were collected, counted, and re-suspended in sterile phosphate-buffered saline (PBS) at $10 \times 10^6$ cells/ml. Balb/c nude mice (4-6 weeks old, 18-23 g) were anesthetized intraperitoneally using sterile PBS solution with ketamine (50 mg/kg) and xylazine (5 mg/kg) and 100 µl of cell suspension ($10^6$ 4T1-Luc2-RFP cells) were injected to ankle intramuscularly with a 29-gauge in ½ inch Needle. (Terumo medical, Shibuya-ku, Tokyo, Japan). After 2 weeks, the 4T1 xenografted cancer murine mice will be developed and ready for imaging.

K562 xenografted cancer murine model. K562-GFP cells were collected, counted, and re-suspended in sterile phosphate-buffered saline (PBS) with 1:1 Matrigel at $10 \times 10^7$ cells/ml. Balb/c nude mice (4-6 weeks old, 18-23 g) were anesthetized using sterile PBS solution with 10% ketamine and 2% xylazine (5 µl/g) and 100 µl of cell suspension ($10 \times 10^6$ K562-GFP cells) were injected to ankle intramuscularly with a 29-gauge in ½ Inch Needle. (Terumo medical, Shibuya-ku, Tokyo, Japan). After 2 weeks, the K562 xenografted cancer murine mice will be developed and ready for imaging.

In Vivo Imaging of the Sciatic Nerve at 4T1 & K562 Xenografted Cancer Murine Model using Two-Photon Confocal Microscopy Mice (8-10-week-old balb/c male, n=3) were fully anesthetized using Xylazine/Tiletamine hydrochloride mentioned above. The femur skin and cancer tissue were gently dissected till exposing sciatic nerve. The glass coverslip was placed on the top of sciatic nerve with sufficient amount of phosphate-buffered saline and adjust the position of the leg of the mice to ensure the glass coverslip is parallel to horizontal plane. The sciatic nerve was scanned from SHG excitation wavelength from 820-980 nm at 10 nm interval. Images of sciatic nerve were acquired with a water immersion objective lens (Nikon CFI75 Apochromat 16×, 0.8 NA).

Data Acquisition and Processing of the Images Acquired from Two-Photon Confocal Microscopy The image stack acquired by spectral scanning (820-980 nm at 10 nm intervals) was normalized by input laser intensity provided from laser manufacturer (Coherent, USA) and the PMT sensitivity (300-800 nm) provided from microscopy manufacturer (Nikon, Japan). Using normalized images acquired as described above, nerves and adjacent non-nerve tissue were hand selected using the oval shape tool in ImageJ to select 5 representative regions of interest for nerve and its adjacent non-nerve tissue. The mean pixel intensities within the selected areas were compared for nerve against adjacent background tissue to calculate the signal of nerve to background tissue contrast. Exactly the same ROIs were evaluated on corresponding fluorescence images with fluoromyelin stained nerve. Results of nerve to background tissue contrast for both reflectance and fluoromyelin fluorescent signal was compared and plotted for each wavelength. Result of nerve reflectance intensity and nerve to muscle contrast for normal murine model and xenografted murine model were compared and plotted for each wavelength. As normalized image intensity from both ex vivo and in vivo were collected using wavelength at 980 nm is below 0.05, which is too low for detection. Image collected at 980 nm was excluded for image analysis.

Optical Setup of Stereomicroscopy & its Data Processing

A Nikon SMZ18 stereomicroscope installed with customized reflectance filter (450/20 and 470/20) (Chroma Technology) was used. The tissue of interest was scanned by light at wavelength at 440-460 and 460-480 nm. The reflectance light from region of interest was collected using customized reflectance filter 450/20 & 470/20, respectively. The image was normalized from the light intensity provided from the fiber illuminator's manufacturer (Nikon, Japan) and the camera (DS-Qi2) sensitivity from camera's manufacturer (Nikon, Japan). Using normalized images, nerves and adjacent non-nerve tissue were hand selected using the polygon shape tool in ImageJ to select regions of interest for nerve and its adjacent non-nerve tissue. The mean pixel intensities within the selected areas were compared for nerve against adjacent muscle tissue to calculate the signal of nerve to muscle contrast.

Stereomicroscopic Video Recording of Dissection of Sciatic Nerve

The video records were captured throughout the entire operation. 4T1 XCMM mice were fully anesthetized using intraperitoneal injection of a mixture of Xylazine (Rompun, 0.4 mL/kg) and Tiletamine hydrochloride (Zoletil, 0.6 mL/kg). The surgical area was wiped with 70% ethanol. Cut the skin at the outside of the thigh, top of the tendon will be exposed with removing trace amount of the muscle and connective tissue. Then, sciatic nerve will be exposed after part of the muscle and connective tissue were removed. Finally, sciatic nerve will be transected. The whole process of the surgery will be recorded using Nikon SMZ18 stereomicroscope imaging with customized reflectance filter (450/20) (Chroma Technology). The video data was saved in the audio-video interlaced (AVI) format at maximum frame rate of 17.39-18.39 fps.

Labelling Image Class and Annotating the Nerve Segmentation

After collecting the mice dissection surgery video, a software "Daum Pot Player" was used to reduce the frame rate to 600 ms per frame(~1.67 fps). The reduced frame rate video images (RFRVI) were extracted and label the remaining frame to the corresponding category "opening wound", "tendon", "nerve" by their related surgical action. Remarkably, due to leftmost part of the image are overexposed, all the frame(1080×1080) was cropped (From x=0 to x=340) and resized to 512×512.

For annotation of the nerve segment, each frame from nerve class will be manually label masks using the online annotation service Supervisely that takes approximately 2-3 min to process each image.

Deep Learning Model for Nerve Image Classification

Different neural networks in RFRVI dataset were compared and trained for image classification. The RFRVI were randomly divided into the training deep learning system cohort and independent test cohort with the ratio of 1:1 and the training cohort were then used to optimize the model parameters. We also randomly chose 20% of training images to form a validation cohort to guide the choice of hyperparameters. The detail parameters of the classification networks are shown in Table 1. The detail of the fine-tuning is shown in Table 2.

TABLE 1

Summary of hyperparameters used in the proposed nerve image classification neural networks for our proposed MTDLS.

| | |
|---|---|
| Image Resolution | 224 pixels × 224 pixels |
| Epoch for classification head | 10 |
| Epoch for fine tune (* applies for DenseNet169 and DenseNet201) | 15 (20*) |
| Initial learning rate | 0.001 |
| Initial learning rate (fine tune) | 0.0001 |
| Batch Size | 12 |
| Classification head activation | Softmax |
| Optimizer | Adam algorithm |
| Loss function | Sparse categorical cross entropy |

TABLE 2

Fine-tuning parameters of the classification neural networks compared for our proposed MTDLS.

| Model | Range of layers for fine tuning (Number of layers) |
|---|---|
| DenseNET169 | 565-595 (30) |
| DenseNET201 | 670-707 (37) |
| MobileNETV2 | 150-155 (5) |
| ResNet50V2 | 180-190 (10) |
| ResNet101V2 | 360-377 (17) |

Deep Learning Model for Nerve Segmentation

To illustrate deep learning can perform nerve segmentation, we compared and trained different existing neural networks with all the "nerve" category images in RFRVI dataset. All the "nerve" category images were randomly divided into the training cohort, validation cohort and independent test cohort with the ratio of 7:1.5:1.5 and the training cohort were then used to optimize the model parameters, and validation cohort to guide the choice of hyperparameters. The detail parameters of all the networks model training are shown in Table 3.

TABLE 3

Summary of hyperparameters used in the proposed nerve segmentation neural networks compared for our proposed MTDLS.

| Model | UNet | DoubleUNet | DeeplabV3+ |
| --- | --- | --- | --- |
| Batch Size | 1 | 2 | 8 |
| Epoch | 50 | 50 | 60 |
| Learning rate | 0.001 | 0.0001 | 0.0001 |
| Optimizer | Adam | Adam | Polynomial algorithm |
| Image Resolution | 224 × 224 | 224 × 224 | 313 × 313 |
| Data Augmentation | None | 50% random horizontal flipping | None |

Computer Hardware Configuration

All neural network related experiments were performed on a machine featuring an Intel® Core™ i9-9900K CPU 3.6 GHz processor, 32 GB installed RAM, and an NVIDIA GeForce RTX 2080.

Statistical Analysis

Significant differences among normalized intensity and nerve to background tissue ratio means based SHG signal were evaluated using a one-way analysis of variance (ANOVA) followed by a Fisher's least significant difference (LSD) multiple comparison test with no assumption of sphericity using the Geisser-Greenhouse correction to compare all mean nerve-to-background tissue ratios. The p value was set to 0.05 for all analyses. Results are presented as mean±SEM. All statistical analyses were performed using Prism (GraphPad).

Significant differences among nerve to background tissue ratio means using spectral reflectance were evaluated using a one-way analysis of variance (ANOVA) followed by a Fisher's least significant difference (LSD) multiple comparison test with no assumption of sphericity using the Geisser-Greenhouse correction to compare all mean nerve-to-background tissue ratios. The p value was set to 0.05 for all analyses. Results are presented as mean±95% CL. All statistical analyses were performed using Prism (GraphPad).

For the deep learning model for nerve image classification, PSPP (version 1.4.1-g79ad47) was used for all statistical comparisons. The student's t-test was used for all the comparisons in both nerve image classification model and nerve segmentation model. The MCC and AUC of the best nerve image classification model were compared to other nerve classification models one by one. For nerve segmentation models, both IoU and Dice Coefficient were used for comparison with other segmentation models separately. All the statistics were two-sided and a P-value less than 0.05 was considered statistically significant.

Ex Vivo Imaging Tissue Profile

To acquire the precise accurate tissue SHG reflectance profile in the region of 820-980 nm, a SHG excitation ex vivo imaging was performed for nerve and its adjacent tissue, which include muscle, fat, tendon, and vein (FIG. 1a). SHG reflectance intensities varied widely across different tissues, and it observed relative strong signal reflectance for sciatic nerve, femoral nerve, vein, and tendon from 820-910 nm. Relative weak SHG reflectance of muscle and fat varied similarly in the region of 820-980 nm (FIG. 1b). Measured tissue SHG reflectance allow the qualification of ex vivo nerve to background tissues (n/b) signal ratio in the region of 820-980 nm. Mean nerve to muscle(n/m) ratio ranged from 0.9-3.2 for sciatic nerve (SN) (FIG. 1c), while 1.9-3.3 mean n/m ratio for femoral nerve (FN) (FIG. 1d). Mean nerve to fat(n/f) ratio ranged from 1.2-2.2 for SN (FIG. 1c), while 1.4-5.0 mean n/f ratio for FN (FIG. 1d). Mean nerve to tendon(n/t) ratio ranged from 0.5-1.1 for SN (FIG. 1c), while 0.7-1.1 mean n/t ratio for FN (FIG. 1d). Mean nerve to vein(n/v) ratio ranged from 0.8-0.9 for SN (FIG. 1c), while 1.0-1.9 mean n/v ratio for FN (FIG. 1d).

Employing n/b(nerve to background tissue) signal ratio >2.0 as the selection standard for positive detection of nerve, only n/m(nerve to muscle) and n/f(nerve to fat) in the region of 820-960 nm for both sciatic nerve and femoral nerve demonstrated positive nerve contrast from SHG reflectance. By comparing both SN and FN's n/b tissue reflectance in different wavelength, SHG reflectance in the region of 900 nm demonstrates effective n/m and n/f contrast comparing to n/t and n/v contrast. (SN: n/m vs n/v for P=0.0330, n/m vs n/t for P=0.0097, and FN: n/f vs n/t for P=0.0161) (FIGS. 1a-1b, 2a-2b).

In Vivo Nerve SHG Reflectance Imaging with Fluoromyelin Staining

Figure 3:
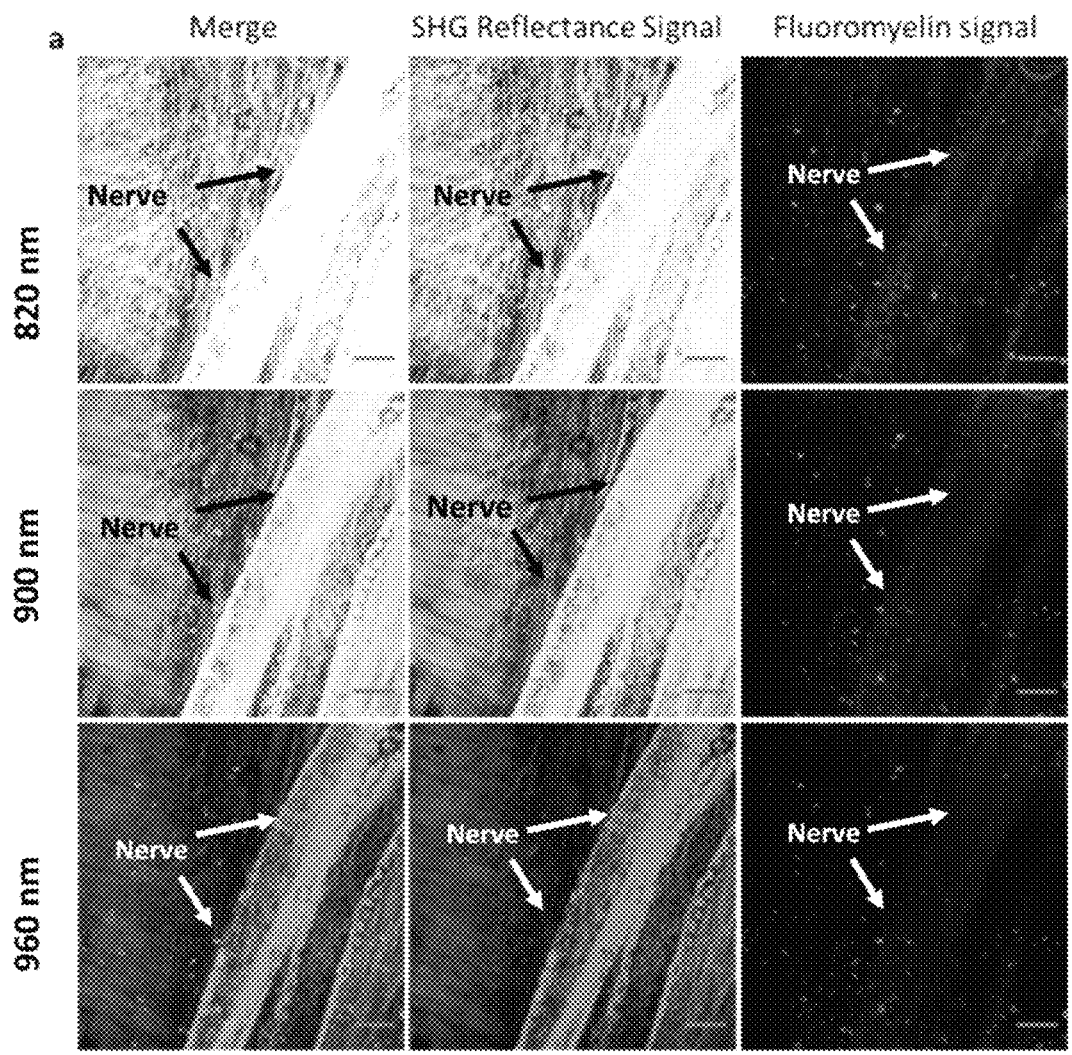
FIG. 3. Comparison of in vivo image intensity ratio of nerve to muscle using wavelength SHG specific reflectance and fluoromyelin fluorescence. (a) Representative maximum intensity projection image of sciatic nerve reflectance (white) stained with fluoromyelin green (myelin specific fluorescent dye, red) in vivo in the region of 820 nm, 900 nm, and 960 nm. (b) Sciatic nerve's signal to the background tissue ratio (SBR) from nerve reflectance and fluoromyelin signal in different wavelength. (c) Nerve to background tissue ratios analysis on the selected wavelengths that nerve reflectance is superior than fluoromyelin signal. Scale Bar: 100 μm. All quantified data are presented as the mean±SEM. Significance was calculated by one-way ANOVA followed by a Fisher's LSD multiple comparison test with no assumption of sphericity using the Geisser-Greenhouse correction. $*P<0.05$ FIG. 4. In vivo SHG reflectance imaging of sciatic nerve in 4T1-luc2-RFP breast cancer xenograft model. (a-c) A representative in vivo reflectance image (white) of sciatic nerve in the region of 820, 900 and 960 nm in xenograft model of 4T1 breast cancer (red fluorescence). (d) A representative bioluminescence image of tumor growth 7 days after subcutaneous injection of 4T1-luc2-RFP breast cancer cells (IVIS-Spectrum). (e) Sciatic nerve's signal to the muscle ratio(SBR) (n=3) under 4T1-luc2-RFP breast cancer heterogenous environment. (f) Quantified n/b(n=3) were calculated for comparison in the different wavelength. Significance was calculated by one-way ANOVA followed by a Fisher's LSD multiple comparison test with no assumption of sphericity using the Geisser-Greenhouse correction. All quantified data are presented as the mean±SEM. Scale bar:100 μm FIG. 5. In vivo reflectance imaging of sciatic nerve in 4T1-luc2-RFP breast cancer xenograft models. (a) Tissue to muscle contrast between nerve and tendon. All quantified data are presented as the mean±95% confidential interval (CI). Significance was calculated by one-way ANOVA followed by a Fisher's LSD multiple comparison test with no assumption of sphericity using the Geisser-Greenhouse correction. $* * * P<0.001.****P<0.0001$ (b-c) Reflectance image taken with 440-460 nm channel. (b) Tendon (c) Nerve. (d-e) Reflectance image taken with 460-480 nm channel. (d) Tendon (e) Nerve. Scale bar: 2 mm FIG. 6. Visualization of surgical steps using nerve-specific spectral reflectance. Representative images of the surgical steps in different channels, which are 440-460 nm, 460-480 nm, brightfield (BF). (a-i) Opening Wound, (j-l) Tendon, (m-y) Nerve. Scale bar:2 mm FIG. 7. Visualization of nerve segmentation using different neural network. (a) Raw Image with nerve, (b) Ground truth Annotation, (c) DoubleUNet's nerve segment prediction, (d) UNet's nerve segment prediction, (e) DeeplabV3+'s nerve segment prediction FIG. 8. In vivo imaging performance using wavelength SHG specific reflectance using normal balb/c mice. (a-c) A representative in vivo reflectance image (white) of sciatic nerve in the region of 820, 900 and 960 nm in normal mice. (d) Comparison of the nerve to background tissue ratio using nerve reflectance between the control and with fluoromyelin staining. All quantified data (n=3) are presented as the mean±SEM. Scale bar:100 μm. Significance was calculated by one-way ANOVA followed by a Fisher's LSD multiple comparison test with no assumption of sphericity using the Geisser-Greenhouse correction. $*P<0.05$ FIG. 9. In vivo normalized intensity of fluoromyelin signal, nerve reflectance, and background tissue reflectance. (a) Comparison of nerve reflectance and its background tissue using control mice(n=3) in different wavelength. (b) Comparison of nerve reflectance and its background tissue with fluoromyelin staining (n=3) in different wavelength. All quantified data (n=3) are presented as the mean±SEM. Significance was calculated by one-way ANOVA followed by a Fisher's LSD multiple comparison test with no assumption of sphericity using the Geisser-Greenhouse correction. $*P<0.05$ FIG. 10. In vivo SHG reflectance imaging of sciatic nerve in K562 cancer xenograft model. (a-c) A representative in vivo reflectance image (white) of sciatic nerve in the region of 820, 900 and 960 nm in xenograft model of K562 cancer (green fluorescence). (d) Sciatic nerve's signal to the muscle ratio (SBR) (n=3) under K562 cancer heterogenous environment. (e) Quantified n/b (n=3) were calculated for comparison in the different wavelength. Significance was calculated by one-way ANOVA followed by a Fisher's LSD multiple comparison test with no assumption of sphericity using the Geisser-Greenhouse correction. All quantified data are presented as the mean±SEM. Scale bar:100 μm FIG. 11. Schematic diagram of the proposed Multi-task deep learning based system (MTDLS) nerve-specific reflectance video recording.
Figure 3:
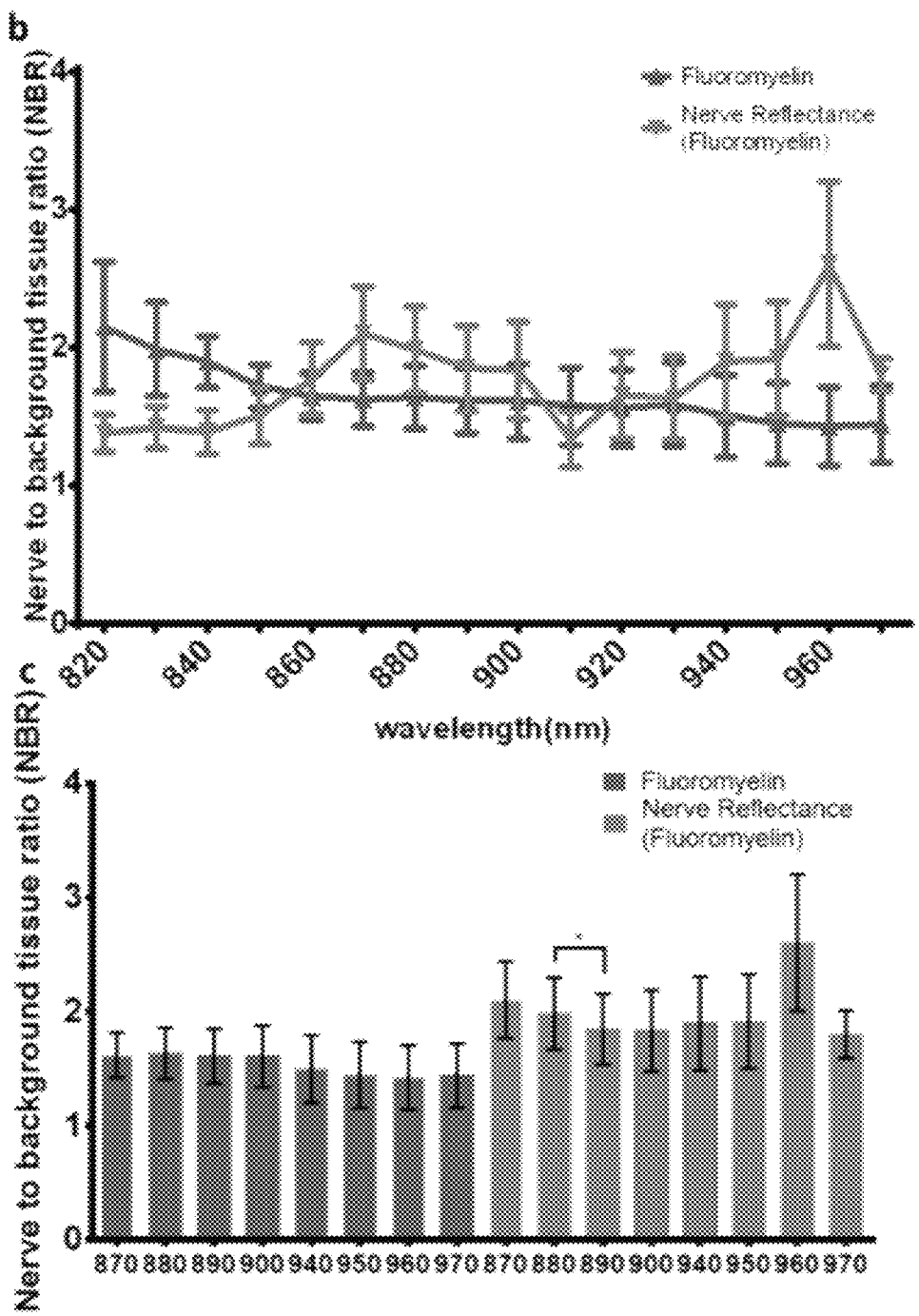
Figure 8:
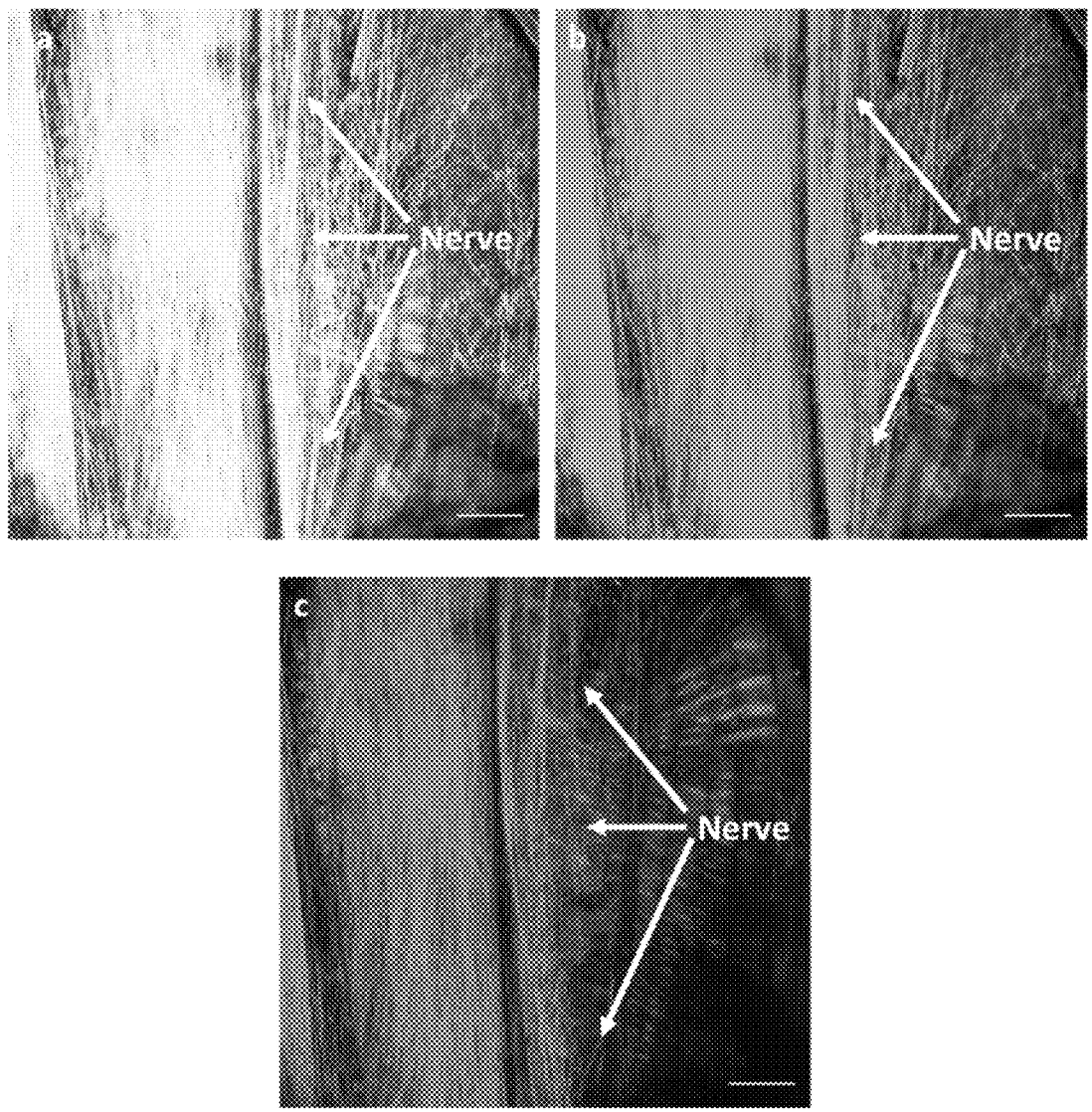
Figure 8:
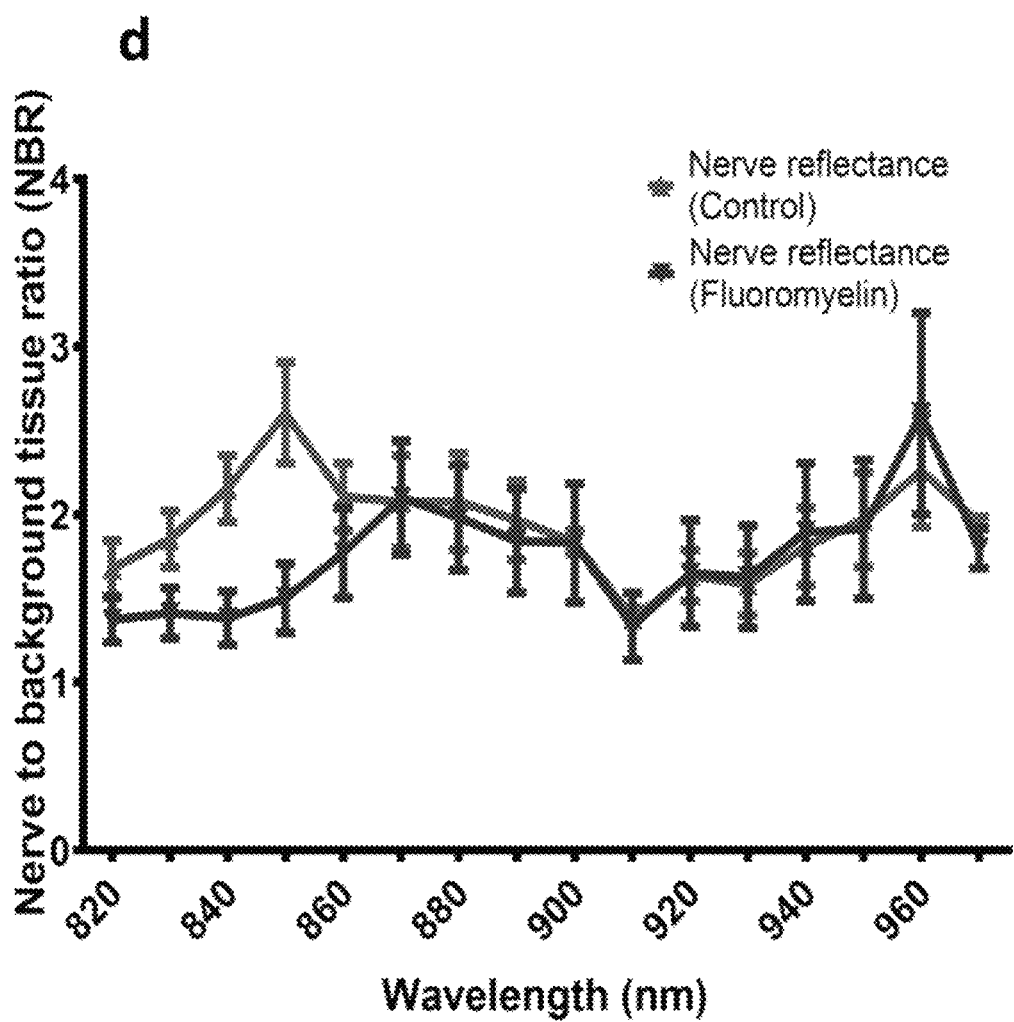
Figure 9:
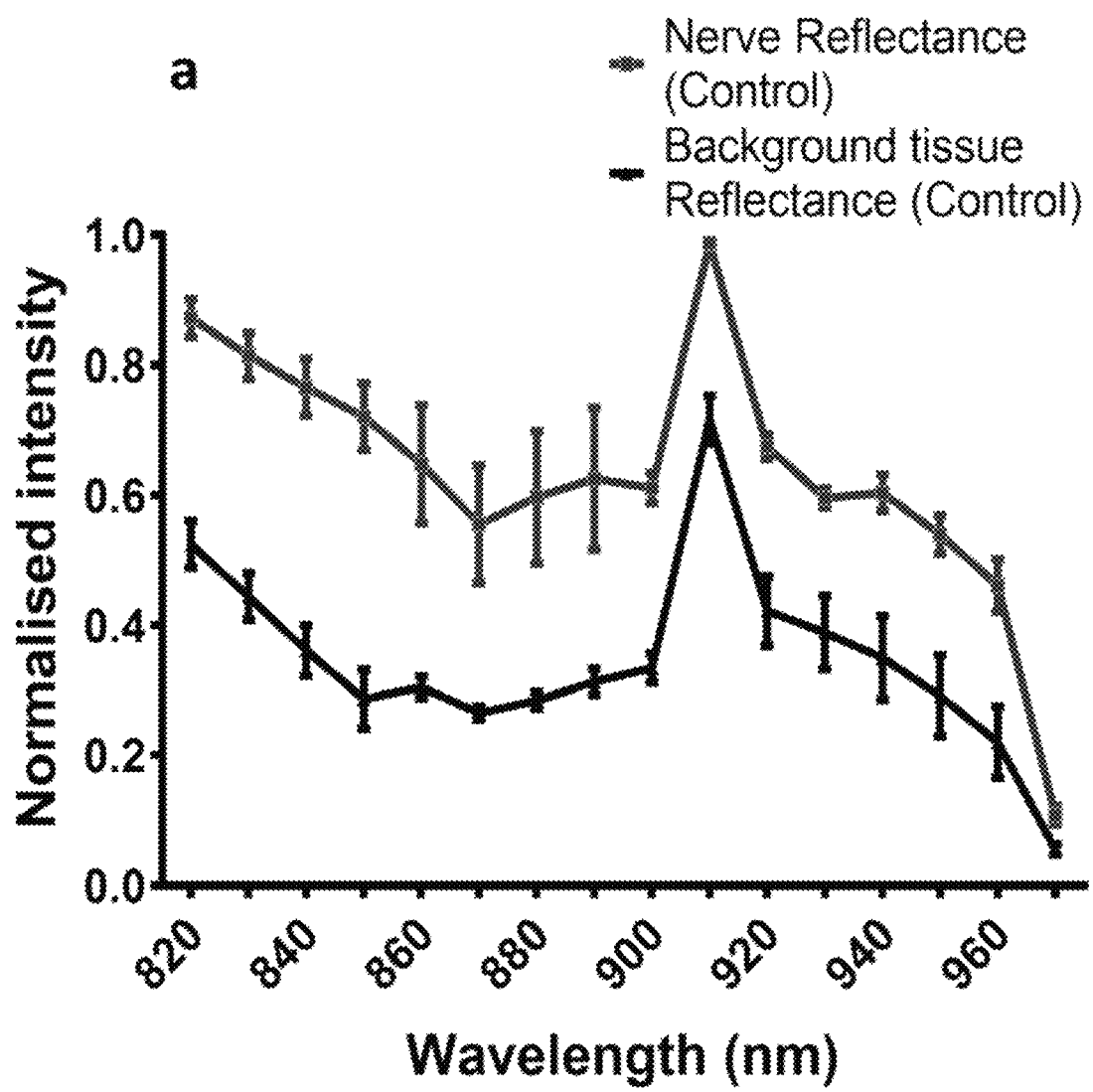
Figure 9:
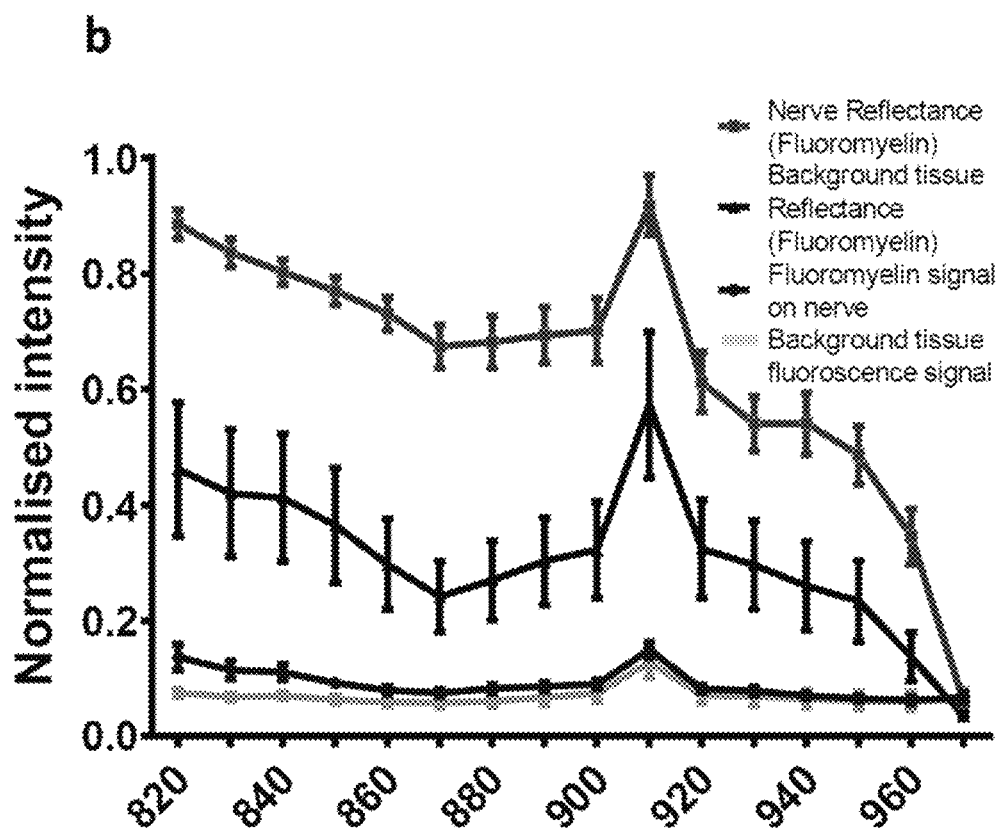

To evaluate SHG nerve reflectance was better than fluorescent imaging with nerve contrast agent, imaging the sciatic nerve stained with one of the conventional nerve contrast agents, fluoromyelin [maximum excitation=479 nm, maximum emission=598 nm], was used as the method to explore the efficacy of positive nerve contrast using specific SHG wavelength reflectance. In vivo SN imaging with fluormyelin staining in the region of 820, 900 and 960 nm were demonstrated (FIG. 3a). By comparing SHG nerve reflectance's n/b ratio to fluoromyelin fluoroscence's n/b ratio, SHG nerve reflectance demonstrated a relative superior imaging performance in the region of 870-900 nm and 940-970 nm. (FIG. 3b-c). Comparing SHG reflectance profile pattern with fluoromyelin and PBS solution (FIGS. 8d, 9), it was indicated a strong absorbance from fluoromyelin in the region of 820-850 nm. (n/b(fluoromyelin) vs n/b (control) at each wavelength: P=0.9943 at 820 nm, P=0.929 at 830 nm, P=0.5877 at 840 nm, P=0.3318 at 850 nm, P>0.9999 at 860 nm, P>0.9999 at 870 nm, P>0.9999 at 880 nm, P>0.9999 at 890 nm, P>0.9999 at 900 nm, P>0.9999 at 910 nm, P>0.9999 at 920 nm, P>0.9999 at 930 nm, P>0.9999 at 940 nm, P>0.9999 at 950 nm, P=0.986 at 960 nm, P=0.953 at 970 nm). With the fluoromyelin staining, it reduced SHG nerve reflectance and lessening 0.4-0.9 mean n/b ratio at 820-850 nm.

Figure 4:
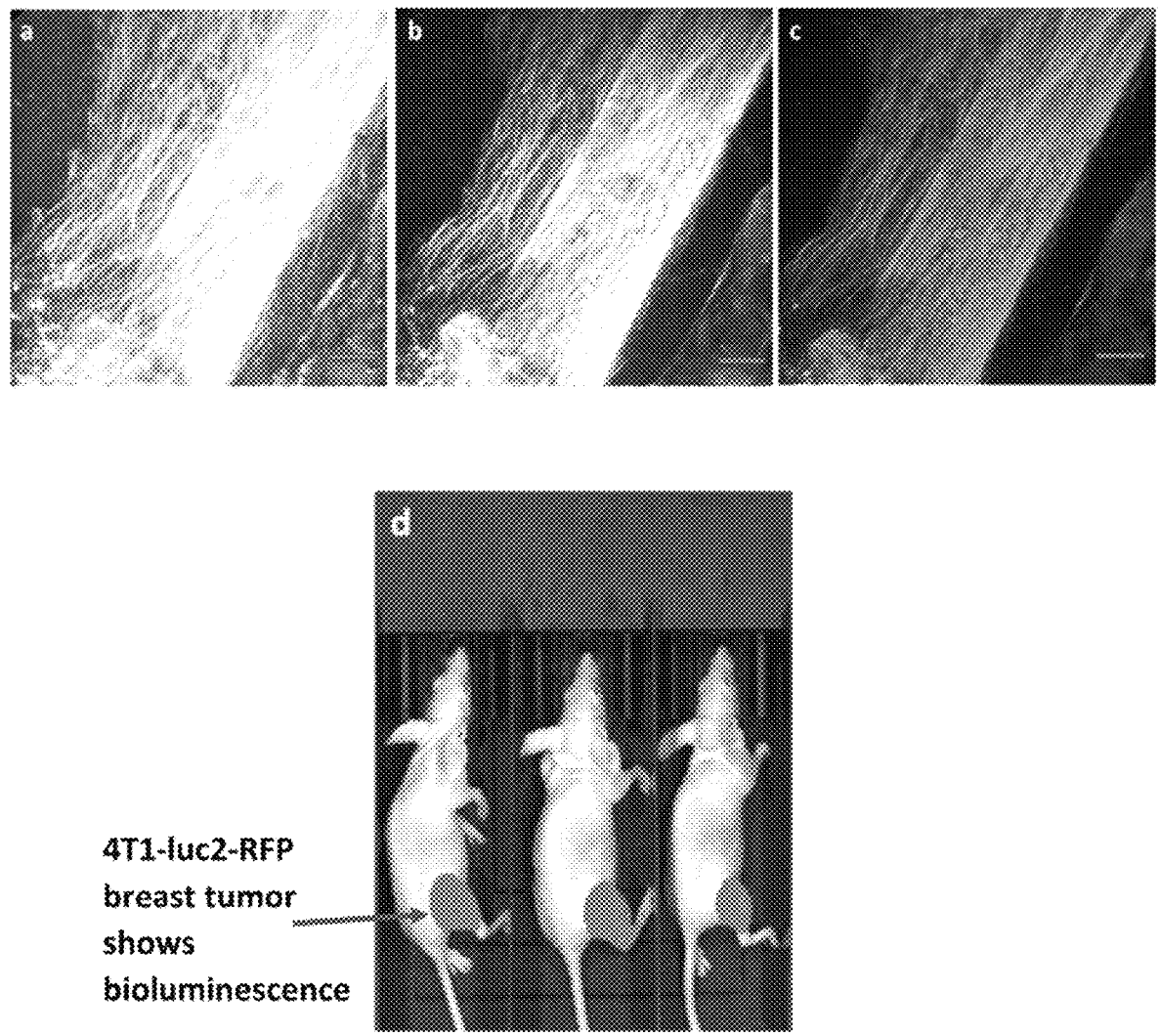
Figure 4:
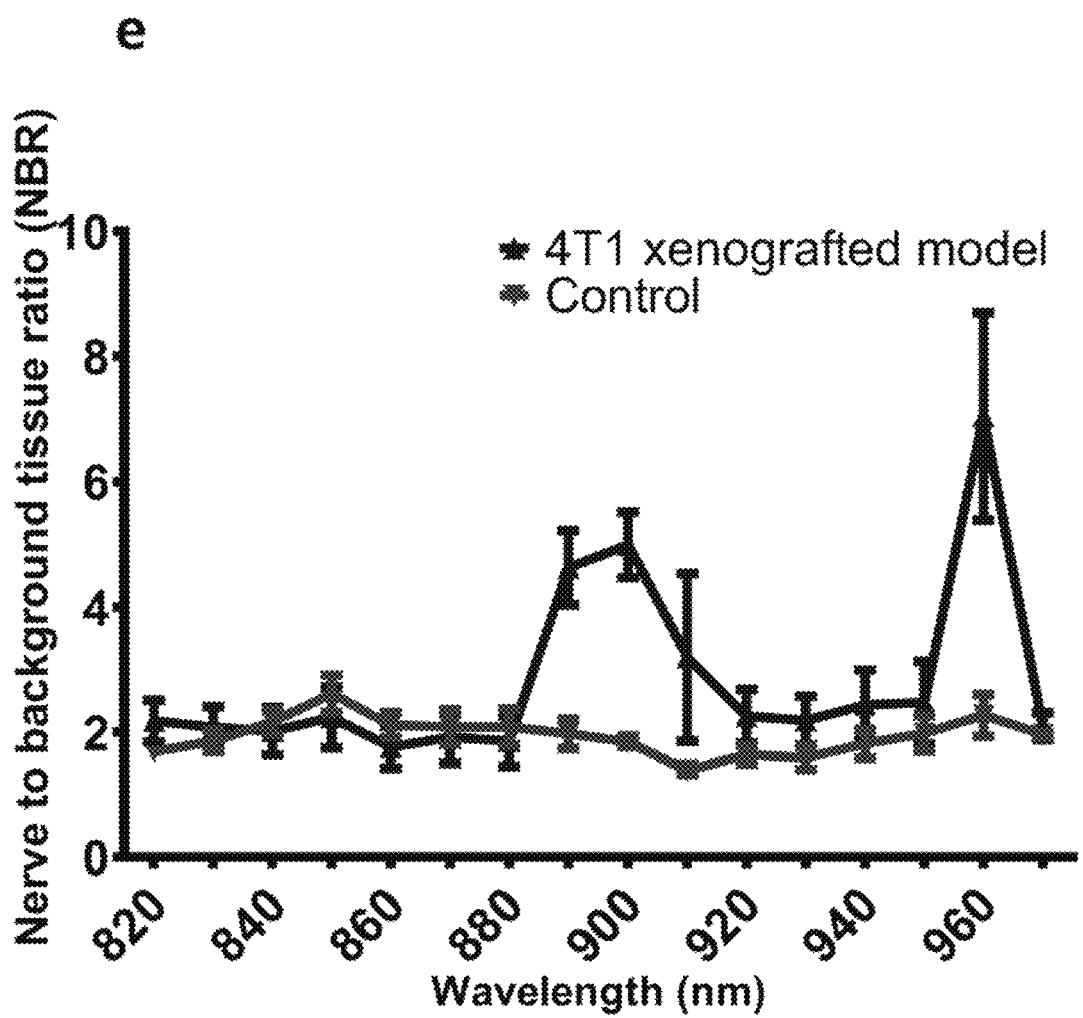
Figure 4:
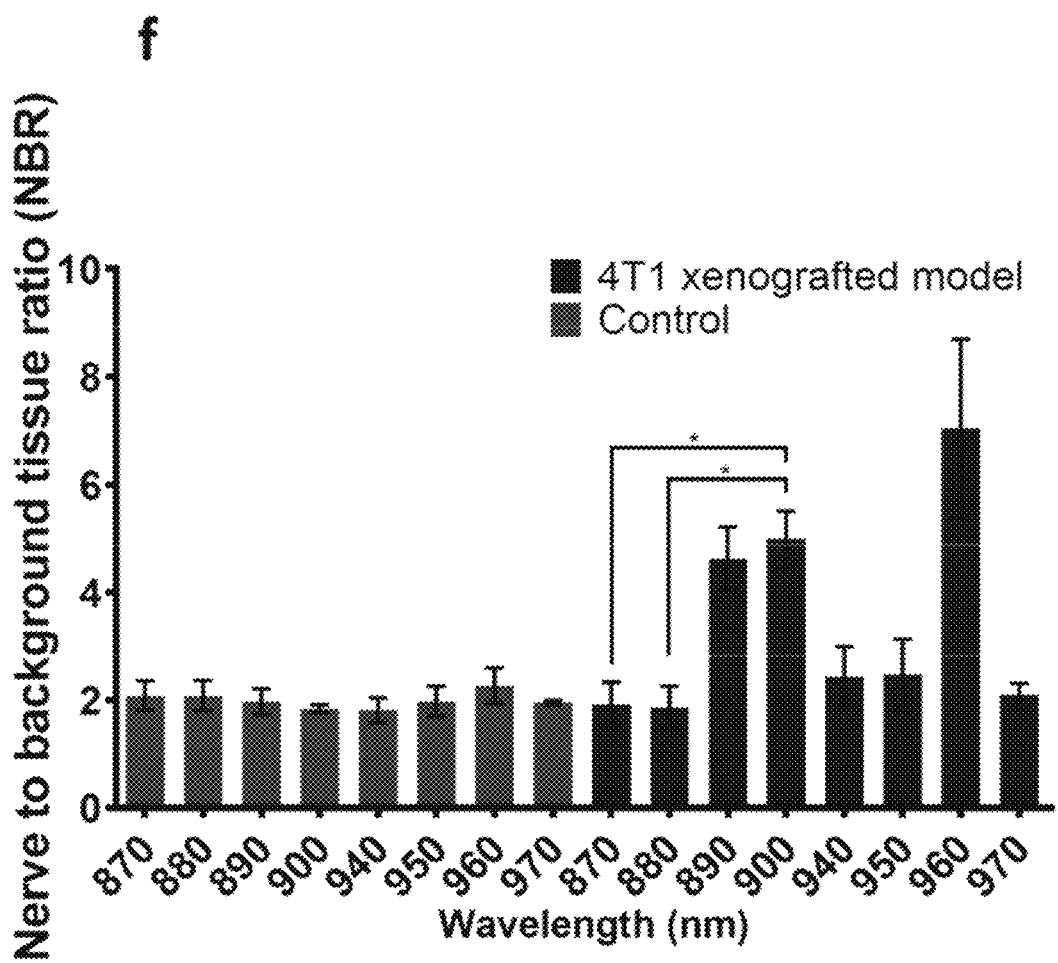

In Vivo Nerve SHG Reflectance Imaging Performance Using Murine Xenografted Model To assess imaging performance of SHG reflectance under heterogenous environment, in vivo SN imaging were performed using 4T1 murine xenografted model. In vivo SN imaging using 4T1 xenografted model (FIG. 4a-c) in the region of 820, 900 and 960 nm were demonstrated. The bioluminescence image of tumor growth 7 days after subcutaneous injection of 4T1-luc2-RFP breast cancer cells (FIG. 4d). Nerve SHG reflectance intensities varied widely across the selected wavelength of interest, with a stronger nerve reflectance signal while comparing xenografted model to control. SHG nerve reflectance under 4T1 heterogenous environment demonstrated a better imaging performance in the region of 890-900 nm and 960 nm by comparing their n/b ratio to control mice's n/b ratio (FIG. 4e-f). Under the 4T1 xenografted model, it recorded mean n/b ratio of 4.62, 4.98 and 7.03 at 890, 900 and 960 nm. (4T1 xenografted model vs control's n/b at each wavelength: P=0.8605 at 820 nm, P=0.9983 at 830 nm, P>0.9999 at 840 nm, P=0.9997 at 850 nm, P=0.9966 at 860 nm, P>0.9999 at 870 nm, P>0.9999 at 880 nm, P=0.4841 at 890 nm, P=0.2298 at 900 nm, P=0.979 at 910 nm, P=0.8159 at 920 nm, P=0.6317 at 930 nm, P=0.9099 at 940 nm, P=0.9927 at 950 nm, P=0.5436 at 960 nm, P>0.9999 at 970 nm) (890 nm vs other wavelength's n/b in 4T1 xenografted model: P=0.6774 at 820 nm, P=0.6408 at 830 nm, P=0.628 at 840 nm, P=0.4377 at 850 nm, P=0.1836 at 860 nm, P=0.1516 at 870 nm, P=0.1497 at 880 nm, P=0.9046 at 900 nm, P=0.9276 at 910 nm, P=0.2658 at 920 nm, P=0.2565 at 930 nm, P=0.4465 at 940 nm, P=0.606 at 950 nm, P=0.7936 at 960 nm, P=0.2283 at 970 nm) (900 nm vs other wavelength's n/b in 4T1 xenografted model: P=0.5374 at 820 nm, P=0.5135 at 830 nm, P=0.5222 at 840 nm, P=0.4377 at 850 nm, P=0.0601 at 860 nm, P=0.0333 at 870 nm, P=0.0354 at 880 nm, P=0.9046 at 890 nm, P=0.815 at 910 nm, P=0.2876 at 920 nm, P=0.2671 at 930 nm, P=0.4676 at 940 nm, P=0.6043 at 950 nm, P=0.9205 at 960 nm, P=0.1834 at 970 nm) (960 nm vs other wavelength's n/b in 4T1 xenografted model: P=0.7386 at 820 nm, P=0.7199 at 830 nm, P=0.7086 at 840 nm, P=0.5867 at 850 nm, P=0.4718 at 860 nm, P=0.4489 at 870 nm, P=0.4468 at 880 nm, P=0.7936 at 890 nm, P=0.9205 at 900 nm, P=0.2421 at 910 nm, P=0.5228 at 920 nm, P=0.5235 at 930 nm, P=0.5709 at 940 nm, P=0.5709 at 950 nm, P=0.5356 at 970 nm)

Figure 10:
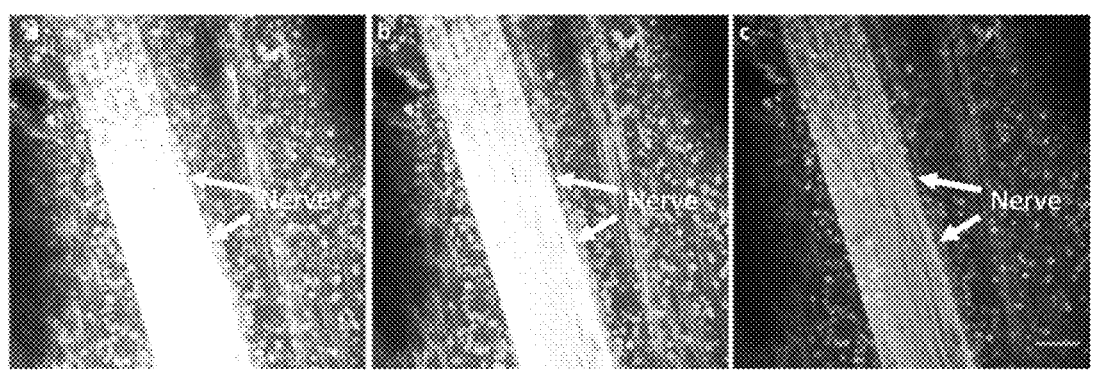
Figure 10:
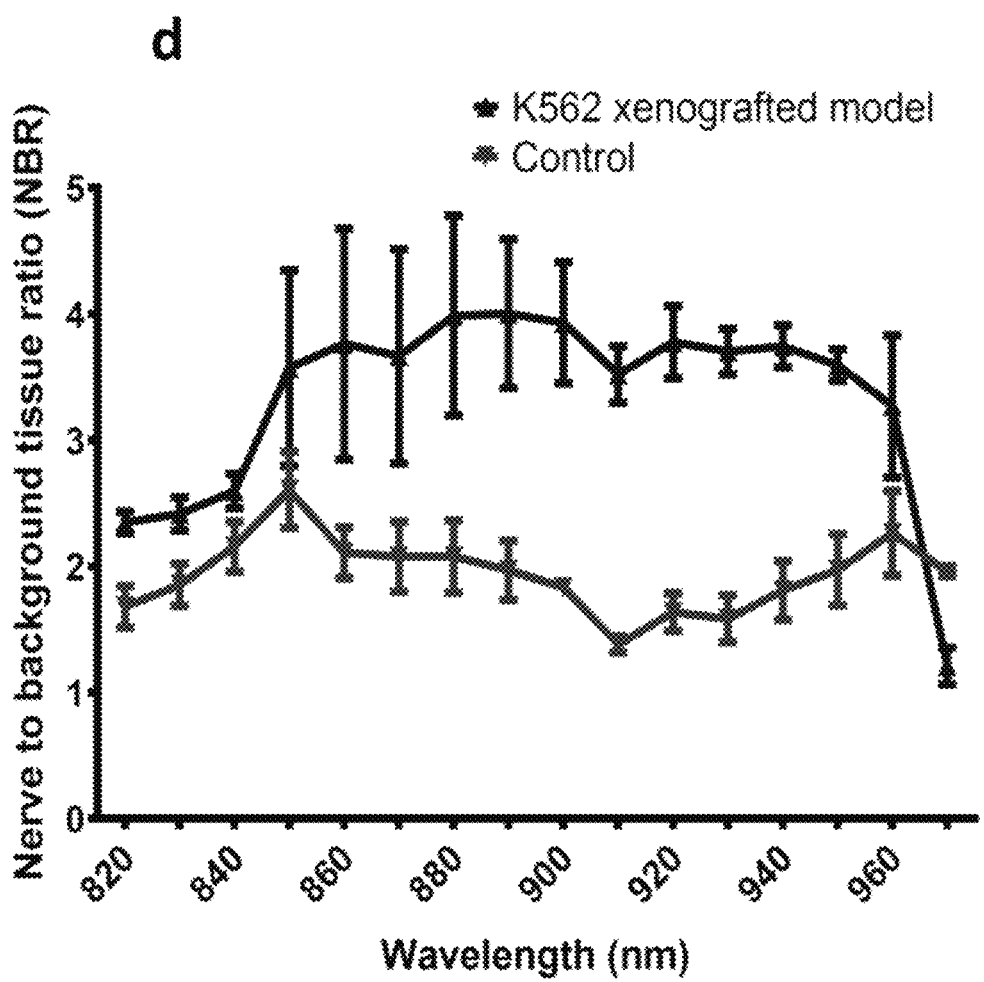
Figure 10:
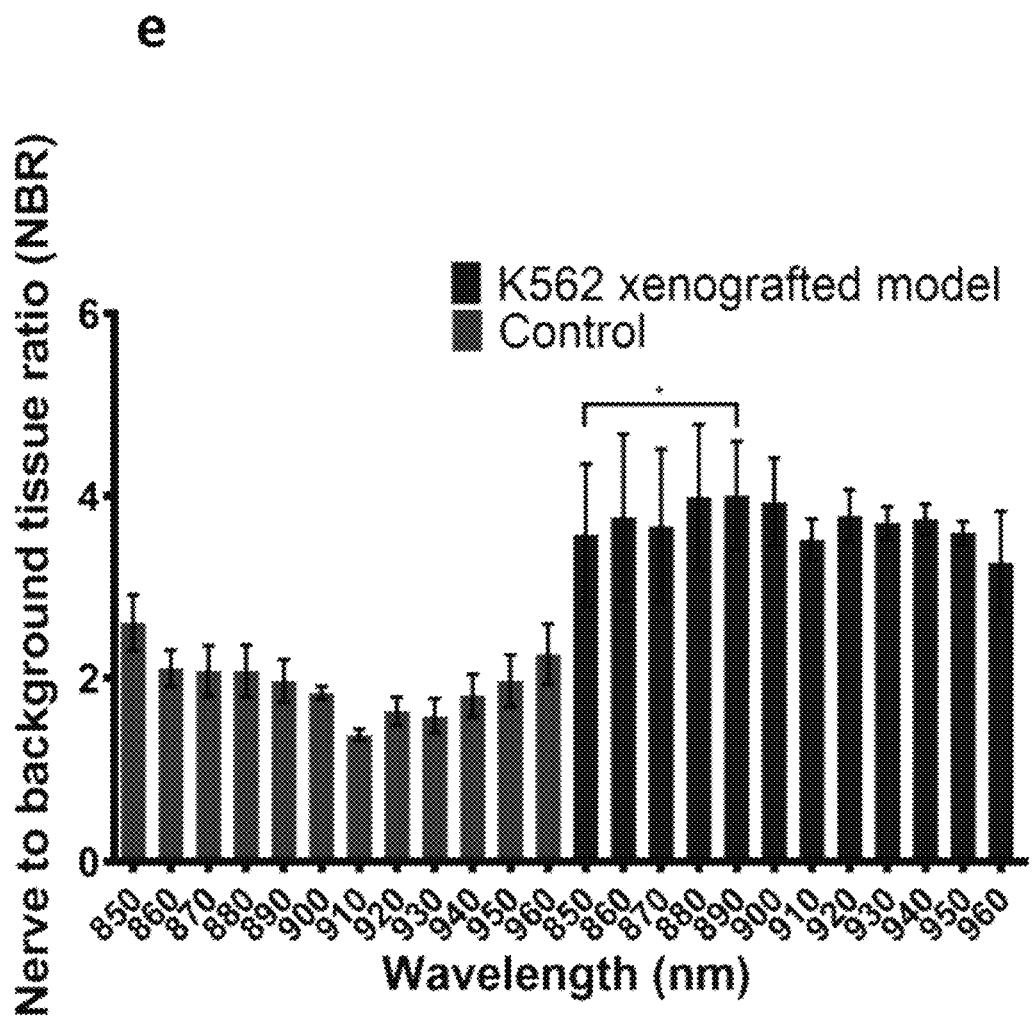

High n/b(3.93) around 900 nm was also shown under K562 murine xenografted model. (FIG. 10) (K562 xenografted model vs control's n/b at each wavelength: P=0.4548 at 820 nm, P=0.7898 at 830 nm, P=0.9459 at 840 nm, P=0.9896 at 850 nm, P=0.8095 at 860 nm, P=0.7392 at 870 nm, P=0.5097 at 880 nm, P=0.2509 at 890 nm, P=0.4259 at 900 nm, P=0.1352 at 910 nm, P=0.3016 at 920 nm, P=0.2218 at 930 nm, P=0.2841 at 940 nm, P=0.288 at 950 nm, P=0.5632 at 960 nm, P=0.2265 at 970 nm)

In Vivo Nerve Spectral Reflectance Imaging Performance Using 4T1 Murine Xenografted Model To validate imaging performance of spectral reflectance under 4T1 heterogenous environment is able to be predicted from its SHG reflectance performance, in vivo SN and tendon imaging were performed using 4T1 murine xenografted model (FIG. 5b-e). For in vivo imaging using 4T1 xenografted model for sciatic nerve and tendon under reflected light at either 440-460 nm and 460-480 nm, it showed there was no significance for the nerve/tendon to background tissue ratio under either 440-460 nm and 460-480 nm. (P=0.9854 under 440-460 nm, P=0.0559 under 460-480 nm) (FIG. 5a). Spectral reflectance of n/b (2.71) under 440-460 nm was much higher than n/b (1.74) under 460-480 nm. These supported reflectance under 440-460 nm provided sufficient contrast to the background tissue for nerve performing in vivo spectral imaging, except tendon like tissue with high spectral reflectance.

Figure 5:
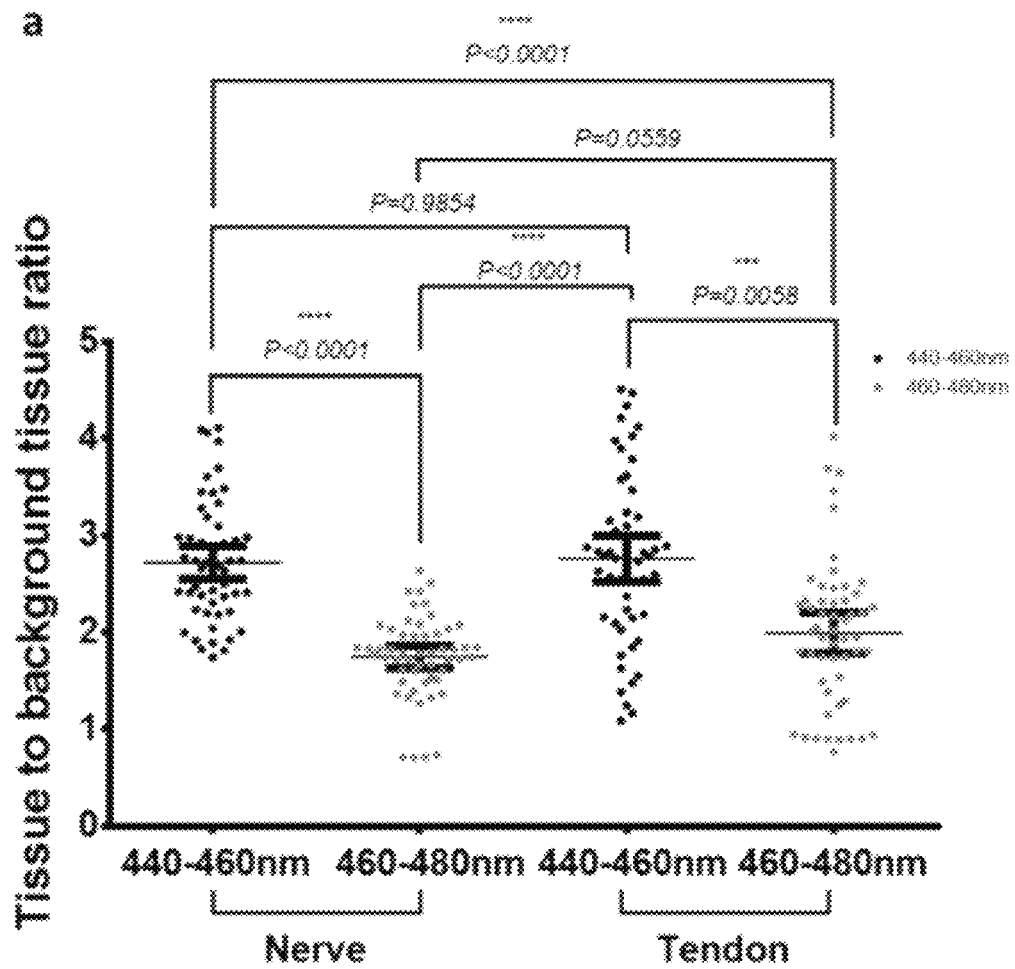
Figure 5:
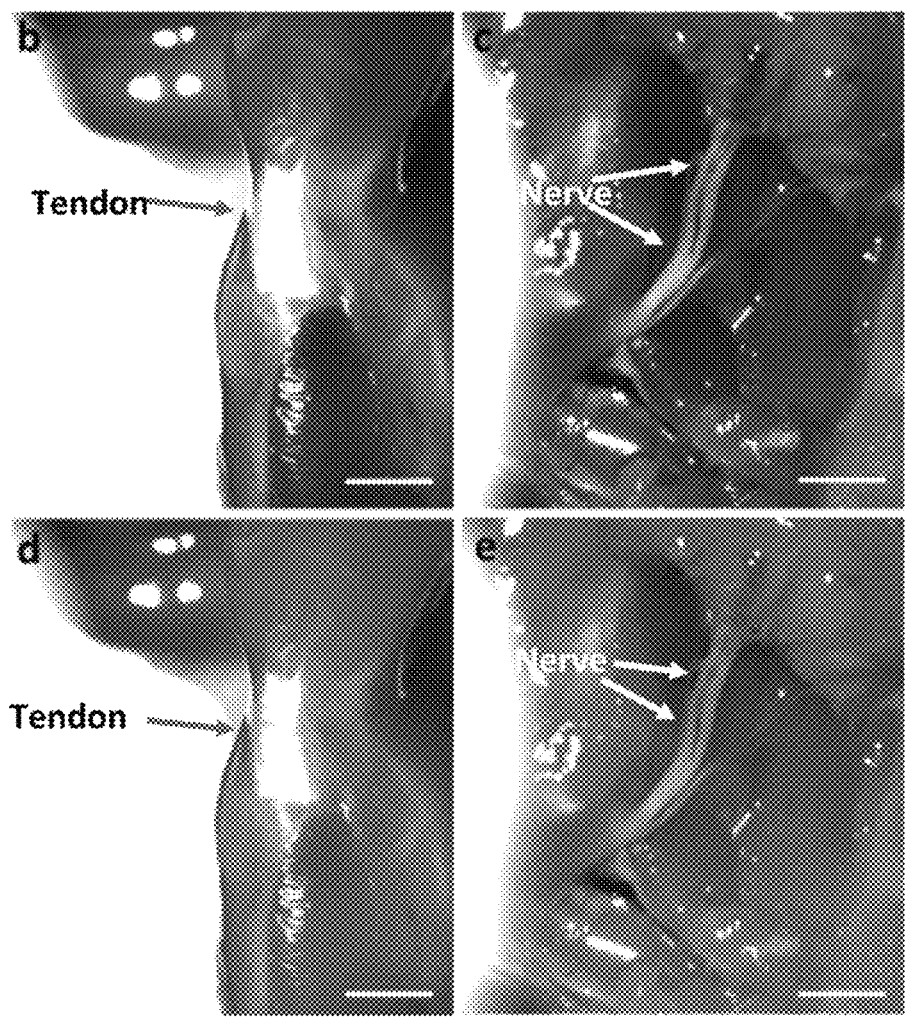
Figure 6:
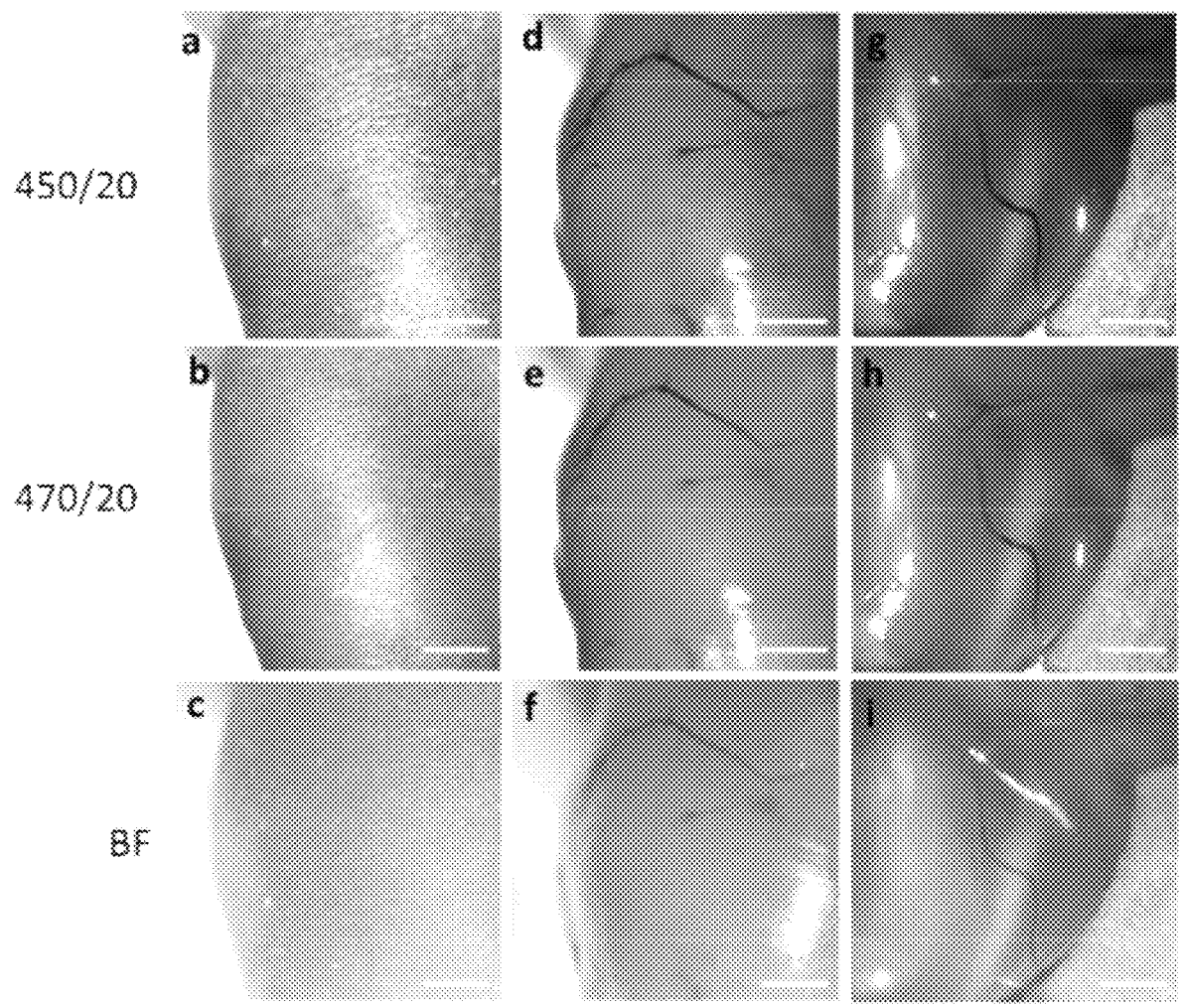
Figure 6:
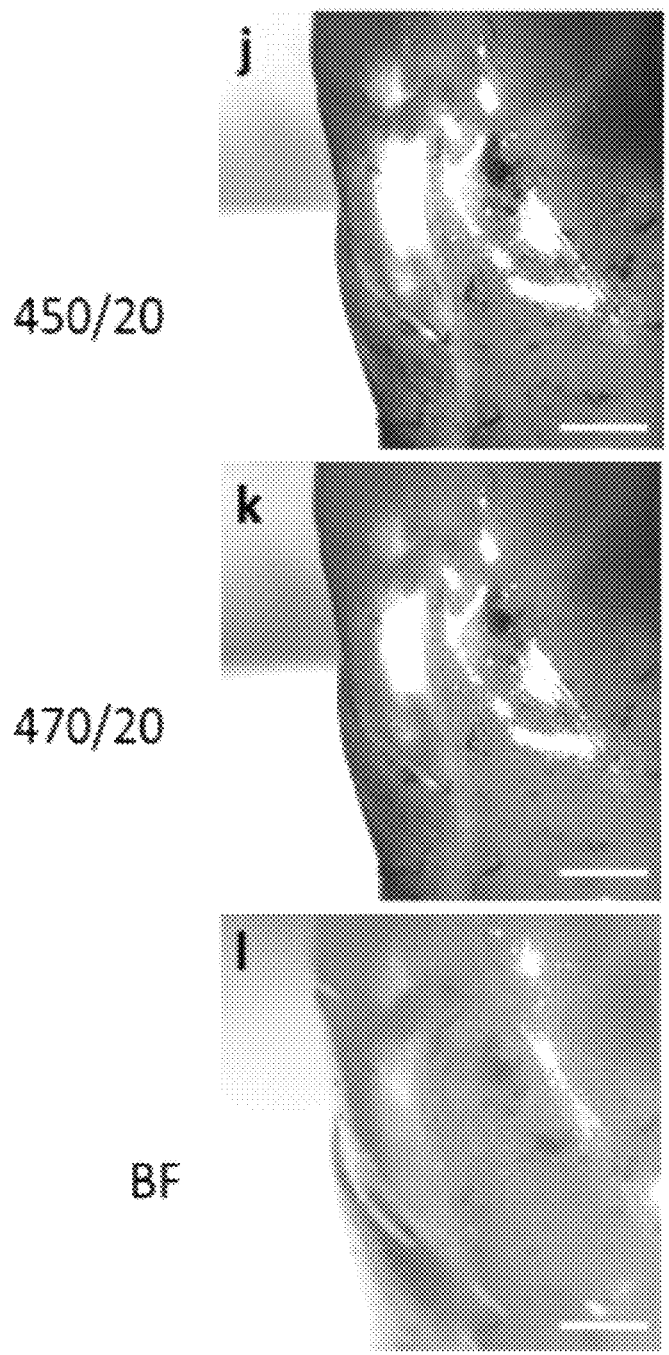
Figure 6:
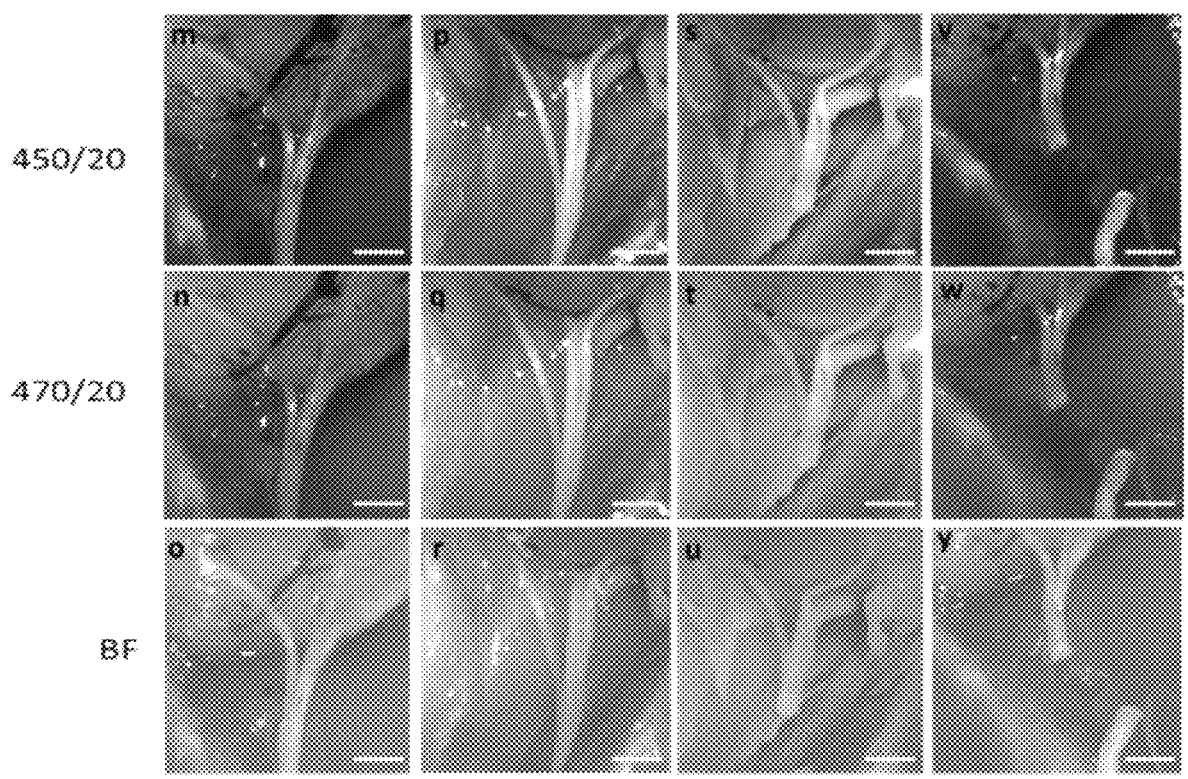

A Multi-Task Deep Learning Based System (MTDLS) for Real Time Nerve Segmentation in Nerve-Specific Reflectance Video Recording To mimic the real intraoperative environment for cancer surgery to remove all or part of a tumor, 440-460 nm reflectance filter was used to record the surgery to expose the sciatic nerve using pervious 4T1 xenografted model to simulate the possible surgical action that might cause potential damage to nerve (FIG. 6). From previous finding, 440-460 nm reflectance is not able to distinguish the surgical imaging for tendon (FIG. 5a). Moreover, the recording also included transection of nerve, which is one of the most severe complications during surgery. By overcoming those obstacles, a MTDLS based on surgical recording using 440-460 nm spectral reflectance was developed to alert the surgeon the presence of nerve and provide precise surgical nerve localization. Due to limited manpower for imaging annotation, 11113 images were extracted each frame per 600 ms (~1.67 fps) from 16 surgical videos recording in ~17 fps using 440-460 nm reflectance filter. Our MTDLS was trained and based on these 11113 images for performance evaluation. The system was consisted of 2 different deep learning models with transfer learning approach. It explores the possibility to cross-utilize the existed neural networks used in biomedical imaging and select the suitable neural network for our MTDLS (FIG. 11).

The first neural network model was trained to classify images based on the surgical action or presence of tissue of interest, which simplified into 3 categories including opening wound, tendon and nerve. After comparing the performance of the adopted neural networks for classification in the recent literature, it found DenseNet201 provided the best discriminative ability of nerve image with an AUC=0.9654 (0.9548-0.9760) for 5739 images in the independent test cohort (FIG. 12), and AUC=0.9986 (0.9982-0.9991) for 1074 images in the validation cohort. (Table 4)

TABLE 4

The performance of different classification models for nerve classification

| Model | Dataset | TPR (%) | TNR (%) | PPV (%) | NPV (%) | ACC (%) | MCC | AUC |
|---|---|---|---|---|---|---|---|---|
| DenseNET201 | T | 99.9 (99.82-99.98) | 99.67 (99.23-100.11) | 99.72 (99.35-100.09) | 99.88 (99.79-99.97) | 99.79 (99.60-99.98) | 0.9958 (0.9920-0.9996) | 0.9997 (0.9993-1.0001) |
| | V | 99.24 (98.62-99.86) | 98.03 (96.59-99.46) | 98.32 (97.14-99.51) | 99.11 (98.40-99.82) | 98.68 (98.17-99.18) | 0.9735 (0.9636-0.9834) | 0.9986 (0.9982-0.9991) |
| | IVFTC | 95.21 (93.85-98.57) | 86.41 (80.77-92.05) | 87.69 (83.59-91.78) | 95.94 (93.60-98.29) | 91.29 (89.60-92.99) | 0.8312 (0.8053-0.8572) | 0.9654 (0.9548-0.9760) |
| DenseNET169 | T | 99.97 (99.92-100.01) | 99.53 (99.29-99.77) | 99.6 (99.40-99.81) | 99.96 (99.91-100.01) | 99.77 (99.68-99.85) | 0.9953 (0.9935-0.9971) | 0.9998 (0.9997-1) |
| | V | 99.31 (98.64-99.97) | 96.86 (94.57-99.15) | 97.37 (95.51-99.24) | 99.19 (98.43-99.95) | 98.18 (97.45-98.90) | 0.9636 (0.9497-0.9776) | 0.998 (0.9974-0.9986) |
| | IVFTC | 96.75 (94.15-99.35) | 83.44 (76.35-90.54) | 89.21 (80.55-90.44) | 96.43 (93.78-99.09) | 90.07 (87.71-92.43) | 0.8105(a) (0.7743-0.8468) | 0.9589(e) (0.9528-0.9650) |
| ResNET50V2 | T | 99.96 | 99.51 | 99.59 | 99.95 | 99.75 | 0.995(c) | 0.9986 |

TABLE 4-continued

The performance of different classification models for nerve classification

| Model | Dataset | TPR (%) | TNR (%) | PPV (%) | NPV (%) | ACC (%) | MCC | AUC |
|---|---|---|---|---|---|---|---|---|
| | | (99.90-100.01) | (99.34-99.68) | (99.44-99.73) | (99.89-100.01) | (99.67-99.84) | (0.9934-0.9967) | (0.9982-0.9991) |
| | V | 98.23 | 97.51 | 97.86 | 97.94 | 97.9 | 0.9577 | 0.9964 |
| | | (97.64-98.83) | (96.85-98.16) | (97.30-98.41) | (97.24-98.63) | (97.34-98.46) | (0.9464-0.9689) | (0.9945-0.9984) |
| | IVFTC | 96.74 | 82.26 | 84.41 | 96.23 | 89.47 | 0.7981(b) | 0.9523(f) |
| | | (95.78-97.69) | (80.35-84.18) | (83.06-85.76) | (95.24-97.22) | (88.80-90.14) | (0.7867-0.8096) | (0.9473-0.9573) |
| ResNET101V2 | T | 98.38 | 99.67 | 99.71 | 98.14 | 98.97 | 0.9795 | 0.9975 |
| | | (96.38-100.37) | (99.40-99.94) | (99.49-99.94) | (95.89-100.39) | (97.92-100.01) | (0.9589-1.0000) | (0.9954-0.9996) |
| | V | 96.57 | 97.75 | 98.05 | 96.16 | 97.11 | 0.9426 | 0.9894 |
| | | (93.64-99.50) | (96.45-99.05) | (96.99-99.11) | (93.00-99.31) | (95.99-98.24) | (0.9208-0.9644) | (0.9849-0.9939) |
| | IVFTC | 88.88 | 87.17 | 87.59 | 89.33 | 88.02 | 0.7648(c) | 0.9251(g) |
| | | (80.38-97.39) | (80.94-93.40) | (83.34-91.85) | (82.08-96.59) | (86.43-89.62) | (0.7303-0.7994) | (0.9085-0.9417) |
| MobileNETv2 | T | 99.45 | 99.26 | 99.37 | 99.36 | 99.36 | 0.9872 | 0.9986 |
| | | (98.49-100.41) | (99.11-99.41) | (99.25-99.50) | (98.24-100.48) | (98.85-99.88) | (0.9769-0.9975) | (0.9981-0.9992) |
| | V | 97.99 | 95.9 | 96.55 | 97.68 | 97.02 | 0.9406 | 0.9966 |
| | | (95.65-100.33) | (93.78-98.01) | (94.86-98.24) | (95.14-100.22) | (96.25-97.80) | (0.9256-0.9556) | (0.9950-0.9983) |
| | IVFTC | 94.66 | 83.28 | 85.07 | 94.29 | 88.95 | 0.7865(d) | 0.9592(h) |
| | | (89.75-99.58) | (77.65-88.92) | (81.14-89.00) | (89.92-98.66) | (87.97-89.93) | (0.7704-0.8026) | (0.9511-0.9673) |

95% confidence intervals are included in brackets. TPR true positive rate, TNR true positive rate, PPV positive predict value, NPV negative predict value, ACC accuracy, MCC Matthews correlation coefficient
T training cohort (n = 4300), V validation cohort (n = 1074), IVFTC independent video frame test cohort (n = 5739).
(a) indicates P = 0.233, Densenet201 in comparison with DenseNet169 in independent test cohort.
(b) indicates P < 0.05, Densenet201 in comparison with ResNET50V2 in independent test cohort.
(c) indicates P < 0.01, Densenet201 in comparison with ResNET101V2 in independent test cohort.
(d) indicates P < 0.01, Densenet201 in comparison with MobileNETv2 in independent test cohort.
(e) indicates P = 0.178, Densenet201 in comparison with DenseNet169 in independent test cohort,
(f) indicates P < 0.05, Densenet201 in comparison with ResNET50V2 in independent test cohort.
(g) indicates P < 0.0001, Densenet201 in comparison with ResNET101V2 in independent test cohort.
(h) indicates P = 0.233, Densenet201 in comparison with MobileNETv2 in independent test cohort.

Figure 7:
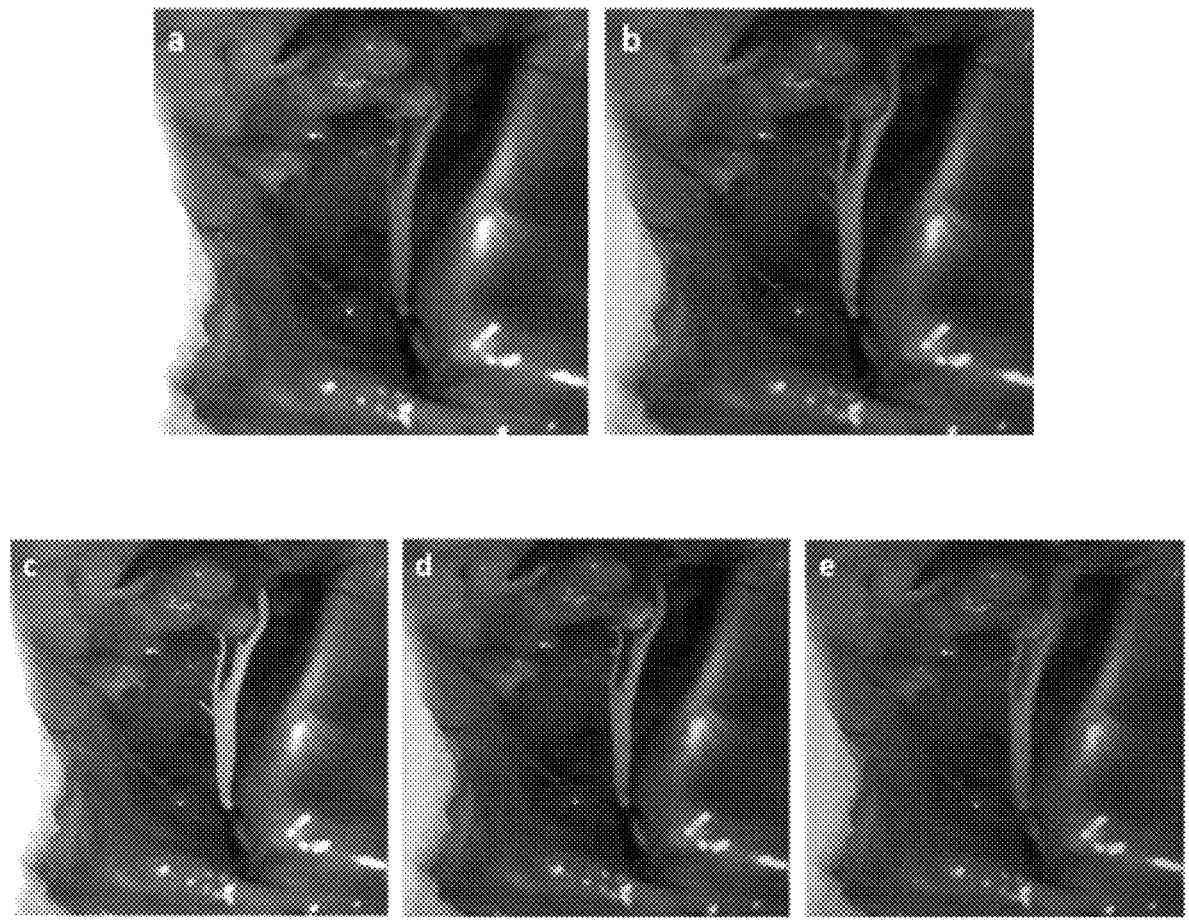

The second neural network model was trained to segment nerve. After comparing the performance of the adopted neural networks for segmentation in the recent literature, it highlighted DoubleUNet provide the best ability in segmenting nerve. For 2249 images in the independent test cohort, DoubleUNet achieved an IOU=0.7977 (0.7891-0.8064) and Dice coefficient=0.8797 (0.8723-0.8872). For 700 images in the validation cohort, DoubleUNet achieved an IOU=0.787 (0.7774-0.7968) and Dice coefficient=0.8707 (0.8621-0.8793). (Table 5). A objective comparison demonstrated using examples for the output nerve segmentation with Unet, Deeplab-V3+ and DoubleUNet (FIG. 7).

TABLE 5

The performance of different neural network models for nerve segmentation

| Model | | IOU | DICE |
|---|---|---|---|
| DoubleUNet | T | 0.9262 (0.9244-0.9280) | 0.9602 (0.9586-0.9618) |
| | V | 0.787 (0.7774-0.7968) | 0.8707 (0.8621-0.8793) |
| | IVFTC | 0.7977 (0.7891-0.8064) | 0.8797 (0.8723-0.8872) |
| Unet | T | 0.8238 (0.8212-0.8265) | 0.9005 (0.8986-0.9025) |
| | V | 0.6623 (0.6494-0.6752) | 0.7762 (0.7641-0.7883) |
| | IVFTC | 0.6786(a) (0.6675-0.6898) | 0.7938(c) (0.7836-0.8039) |
| Deeplab V3+ | T | 0.5185 (0.5135-0.5235) | 0.6791 (0.6747-0.6836) |
| | V | 0.5181 (0.5076-0.5287) | 0.6790 (0.6696-0.6884) |
| | IVFTC | 0.5253(b) (0.5149-0.5356) | 0.6854(d) (0.6763-0.6945) |

95% confidence intervals are included in brackets.
IOU Intersection-Over-Union,
DICE Dice Coefficient
T training cohort (n = 2799), V validation cohort (n = 700), IVFTC independent video frame test cohort (n = 2249).
(a) indicates P < 0.0001, DoubleUNet in comparison with Unet in independent test cohort.
(b) indicates P < 0.0001, DoubleUNet in comparison with Deeplab V3+ in independent test cohort.
(c) indicates P < 0.0001, DoubleUNet in comparison with Unet in independent test cohort.
(d) indicates P < 0.0001, DoubleUNet in comparison with Deeplab V3+ in independent test cohort.

The present disclosure reported reflectance optical properties of myelinated nerve. It was found that nerve reflectance properties diverge dramatically in the region of 410-490 nm, showing a narrow range of wavelength suitable for nerve to induce strong reflectance based on thin film interference principle.

Relative to control (FIG. 8d), it was found that fluoromyelin, a conventional fluorescent dye for targeting myelin-based protein, is sensitive to absorb the SHG excitation wavelength in the region of 820-850 nm (FIG. 3b). When choosing n/b signal ratio>2.0 as the selection standard for positive detection of nerve, labeling with fluoromyelin only with the SHG excitation wavelength in the region of 820 nm provided sufficient n/b contrast for in vivo imaging of sciatic nerve (FIG. 3b). On the other hand, with wider SHG excitation wavelength in the region of 840-880 nm, positive detection of nerve (FIG. 8d) can be provided from direct nerve reflectance. Furthermore, labelling myelin with fluorescent dye might not be consistent due to the concern of photostability. Nerve reflectance provides a solution allowing in vivo peripheral nerve imaging without the use of fluorescent dye.

The present disclosure reported the imaging performance of SHG reflectance under 4T1 xenografted heterogenous environment in the region of 820-970 nm. High n/b ratio was confirmed in the 890-910 nm and 960 nm region. By comparing to the background of the SHG imaging of the sciatic nerve under 4T1 xenografted heterogenous environment (FIG. 4a-c) to the ex vivo SHG specific reflectance of the myelinated nerve adjacent tissue (FIG. 1a), it was clearly observed the background tissue from SHG reflectance of sciatic nerve under heterogenous environment is lipid within relatively lower dense collagenous matrix comparing to normal control mice. From ex vivo SHG specific wavelength profile of fat, it was also observed collagenous matrix from fat tissue is the major source of SHG reflectance. These results show the unique SHG imaging feature of collagen and the properties of low density of collagen within the heterogenous environment. Similar pattern with low collagen SHG reflectance in the region of 850-960 nm was also found under K562 xenografted model (FIG. 10d, 10e).

Although label-free method such as two-photon confocal microscopy, THG, and ScoRe have great potential in imaging myelinated nerve under homogenous and heterogenous environment, they need to imaging the specimen with short working distance. It is hard to implement for intraoperative imaging during surgery. Furthermore, two-photon confocal microscopy requires high light level (on the order of 400-600 mW at the sample) with ultrashort pulsed laser. Thus, there is also a concern of thermal injury for longitudinal imaging. In the present disclosure, the problem has been solved by replacing a camera of collecting fluorescent signal for collecting nerve reflectance signal. Moreover, optical setup of such real time planar spectral imaging system is similar to conventional stereomicroscopy used in pre-clinical animals' studies of intraoperative imaging of nerve during surgery.

In the present system, the light source is mercury light which has no safety concern except for exposing to its harmful level UV radiation. Additionally, it was found the mean n/b ratio of imaging sciatic nerve was measured as 2.72 using 440-460 nm reflectance light, and less of the mean n/b ratio (1.78) using 460-480 nm reflectance light. It shows spectral light around 450 nm is sensitive for myelin reflectance while relatively low reflectance from collagen matrix and muscle in tumor tissue.

Figure 13:
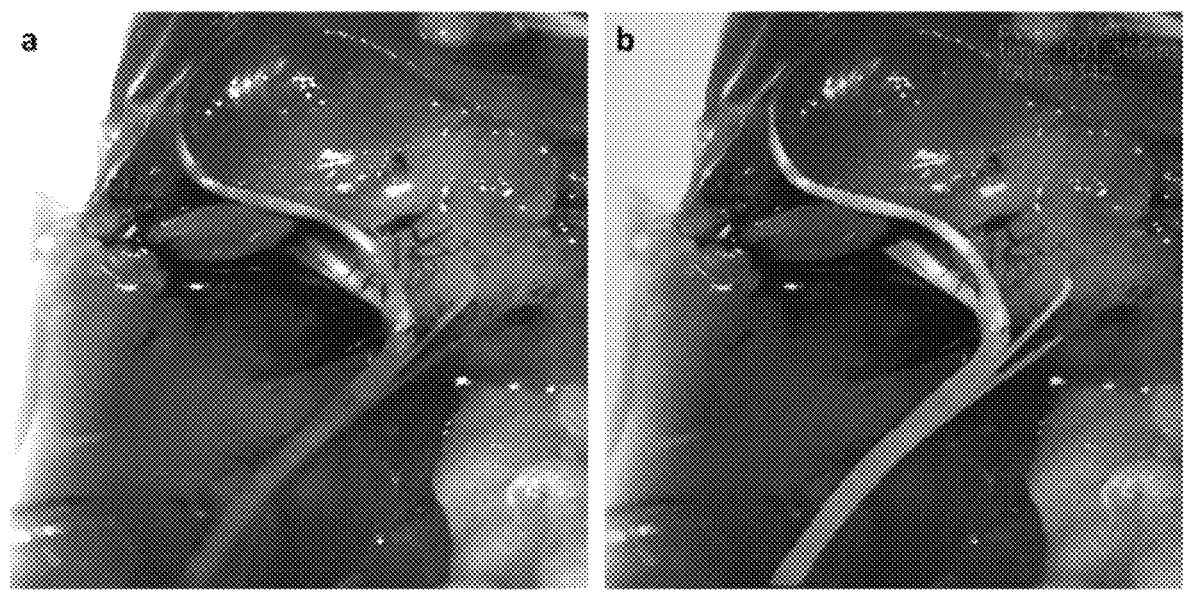
FIG. 13. Comparison of nerve video frame with and without our proposed MTDLS prediction (a) A representative raw video frame with nerve (b) with MTDLS prediction.

Nevertheless, it was found that tendon had a slightly higher tissue to background tissue ratio (2.76) than sciatic nerve (2.72) using 440-460 nm reflectance light. These make tendon or other collagen rich tissue hard to distinguish from nerve based on the tissue to background tissue ratio using the nerve reflectance imaging in specific wavelength. In order to address this problem, the present disclosure applies real-time imaging system using reflectance imaging with the aid of artificial intelligence. Such computed-aid imaging system can alert the presence of nerve and notify the precise location of nerve in a real time manner. The MTDLS described herein firstly filters non-nerve video images including images containing tendon. The remaining nerve video images are detected for nerve delineation. For the method to distinguish nerve and tendon, FIG. 11 relates to AI design for surgical video taken under 440-460 nm reflected light. FIGS. 12 and 13 show the different networks' performance in distinguishing nerve from non-nerve images including opening wound and tendon.

TABLE 6

Average processing time for MTDLS and its network component for classification and segmentation.

| Neural Networks | Average processing time per frame |
|---|---|
| DenseNET201 (Image classification) | 22 ms (~45.4 fps) |
| DenseNET169(Image classification) | 17 ms (~58.8 fps) |
| DoubleUNet (Image segmentation) | 46 ms (~21.7 fps) |
| DenseNET169 + DoubleUNet | 63 ms (~15.9 fps) |
| DenseNET201 + DoubleUNet (Our MTDLS pipeline) | 68 ms (~14.7 fps) |
| DenseNET201 + DoubleUNet (Our proposed MTDLS pipeline with parallel processing) | 46 ms (~21.7 fps) |

In order to save time and manpower for the preparation of labelling frame from videos, a "downsampling" strategy was applied as using a constant time interval for annotation of samples. It significantly reduced the total frame of annotation. During the development of MTDLS for real time imaging, it was found, among several learning models, DenseNet201(AUC=0.9654, MCC=0.8312) and DenseNet169(AUC=0.9589, MCC=0.8105) outperformed other deep learning models for imaging classification. Further, a relatively high IOU (0.7977) and DICE (0.8797) were obtained by utilizing DoubleUNet for nerve segmentation in the videos. Utilizing the "downsampling" strategy, full frame rate videos also show high visual prediction performance for nerve image recognition and nerve segmentation. It implies reduced frame rate video is able to provide sufficient features and patterns for model training. As DenseNet169 and DenseNet201 show similar performance in classifying nerve image and require less processing time comparing to DoubleUNet for nerve segmentation, parallel processing can be applied for such multi-task deep learning system using of minimum 2 processors with theoretical image processing speed operating at ~11.3 fps (FIG. 13). With parallel processing, the MTDLS may have ~1.51-2.72 fps improvement with acceptable processing time for real-time imaging.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A system for real time imaging a peripheral nerve in a tissue sample in a surgery, the system comprising:
   a light source configured to irradiate the tissue sample,
   a photodetector configured to detect reflected light at a wavelength of 410-490 nm from the tissue sample, and
   a computer configured to:
      generate one or more images from the detected reflected light;
      use a first deep learning model to classify the one or more images so as to identify one or more nerve-related extracted images, wherein each of the one or more nerve-related extracted images is an image with a presence of nerve;
      use a second deep learning model to perform segmentation of the peripheral nerve in each of the one or more nerve-related extracted images for highlighting one or more specific anatomical structures of the peripheral nerve to a surgeon during the surgery;
      additionally use the first deep learning model to determine if the second deep learning model for nerve segmentation provides one or more confusing nerve segments; and
      if it is determined that the second deep learning model provides the one or more confusing nerve segments, alert the surgeon to conduct a surgical procedure with extra caution to prevent damage to nerve during the surgery.

2. The system according to claim 1, wherein the light source comprises coherent light, metal-halide lamp, LED light, mercury lamp, superluminescent diodes, or broadband light sources that provide light across a wide range of wavelength.

3. The system according to claim 1, wherein the system further comprises a band pass filter to remove reflected light outside of 410-490 nm wavelength.

4. The system according to claim 1, wherein the photodetector is a stereomicroscope.

5. The system according to claim 1, wherein the first deep learning model is DenseNet201 and the second deep learning model is DoubleUNet.

* * * * *